US 6,535,887 B1

(12) United States Patent
Komine et al.

(10) Patent No.: US 6,535,887 B1
(45) Date of Patent: Mar. 18, 2003

(54) OBJECT-ORIENTED TYPE INFORMATION MANAGING SYSTEM AND A METHOD FOR CONTROLLING MESSAGES BETWEEN OBJECTS IN THE SYSTEM

(75) Inventors: Hiroaki Komine, Kawasaki (JP); Noriyuki Yokoshi, Kawasaki (JP); Tsuyoshi Naka, Kanazawa (JP); Hiroko Yokota, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,974

(22) Filed: Oct. 6, 1999

(30) Foreign Application Priority Data

Oct. 26, 1998 (JP) .......................... 10-303557

(51) Int. Cl.[7] .......................... G06F 17/00; G06F 15/16
(52) U.S. Cl. ........................ 707/103; 709/223
(58) Field of Search ................. 707/102–104, 707/100, 500; 709/1, 100–101, 202, 223, 315, 314, 316–319, 332, 224; 345/681

(56) References Cited

U.S. PATENT DOCUMENTS 5,809,235 A * 9/1998 Sharma et al. .............. 709/230

FOREIGN PATENT DOCUMENTS

WO    97/22197    6/1997
WO    97-48234    12/1997

OTHER PUBLICATIONS

Patent Abstracts of Japan of JP–A–6–109838 published Apr. 22, 1994.
Patent Abstracts of Japan of JP–A–9–073396 published Mar. 3, 1997.
Patent Abstracts of Japan of JP–A–10–133875 published Mar. 22, 1998.

* cited by examiner

*Primary Examiner*—Alford W. Kindred
(74) *Attorney, Agent, or Firm*—Staas & Halsey LLP

(57) ABSTRACT

An object-oriented type information managing system includes a network control system and a network managing system, the network control system includes an upper control object, and the network managing system includes a plurality of processes each having one or more objects. One object is used as a relay object for receiving a request message from the upper control object, and other objects are used as request message destination objects (or, control target objects) managed by the relay object. Each destination object returns a response message. Further, at least one process in the plurality of processes comprises a reply object for receiving the response messages sent from the destination objects and directly sending them to the upper control object.

15 Claims, 23 Drawing Sheets

Fig.2A

HEADER INFORMATION

| PROCESS IDENTIFIER | SENDING-SIDE OBJECT NAME | DESTINATION OBJECT NAME | OTHER COMMUNICATION INFORMATION |
|---|---|---|---|

Fig.2B

PARAMETER INFORMATION

| REQUEST ID | INSTANCE ID | CONTROL INFORMATION | RESPONSE DESTINATION OBJECT NAME |
|---|---|---|---|

Fig.2C

REQUEST ID MANAGING TABLE

| REQUEST ID | RESPONSE DESTINATION OBJECT NAME |
|---|---|
| 1 | UPPER CONTROL OBJECT |
|  |  |

Fig.2D

FINAL RESPONSE MANAGING TABLE

| REQUEST ID | MESSAGE DESTINATION OBJECT NAME |
|---|---|
| 1 | OBJECT-B |
| 2 | OBJECT-C |

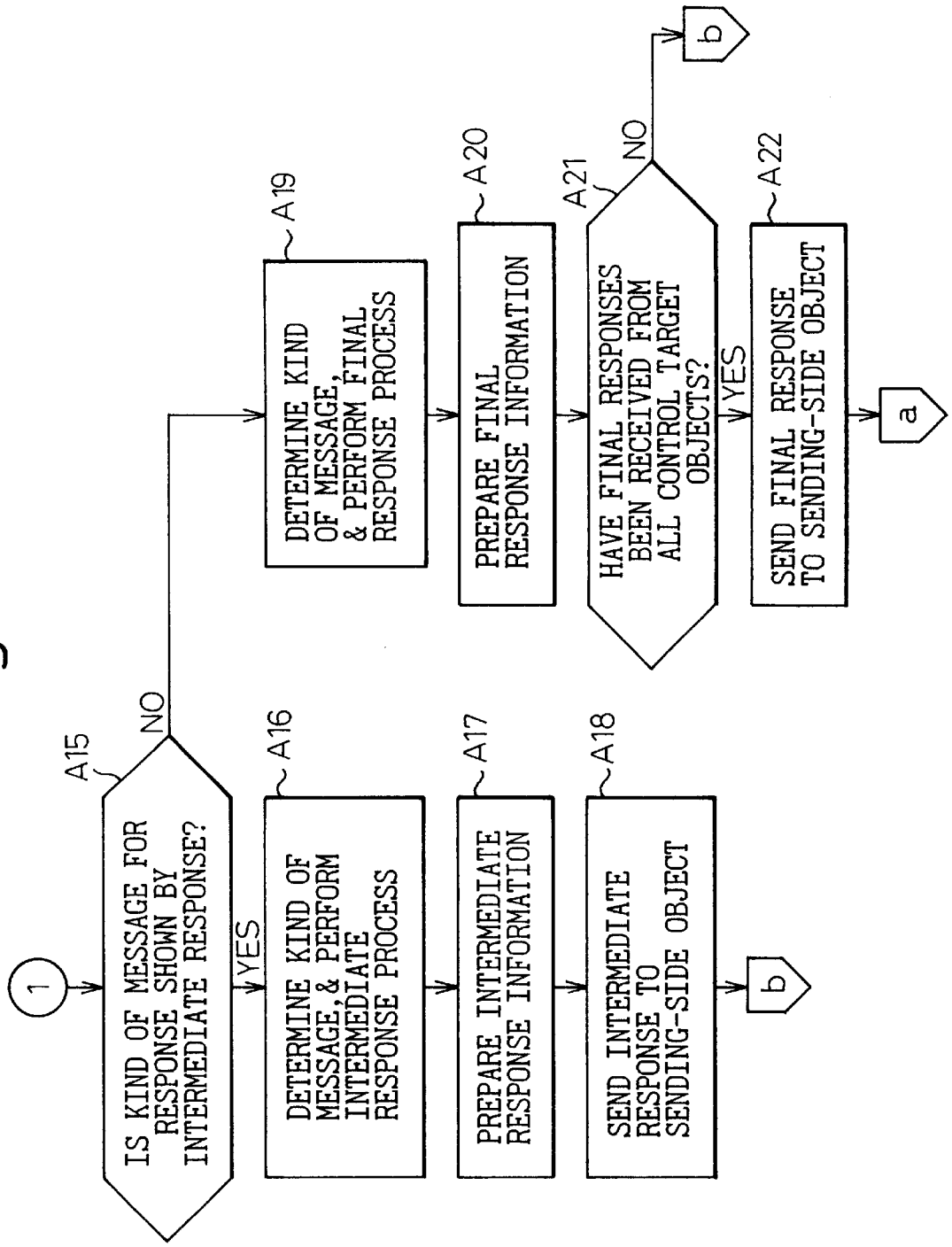

Fig.7A

PARAMETER INFORMATION

| REQUEST ID | INSTANCE ID | CONTROL INFORMATION | INTERMEDIATE RESPONSE DESTINATION OBJECT NAME | FINAL RESPONSE DESTINATION OBJECT NAME |
|---|---|---|---|---|

Fig.7B

INTERMEDIATE RESPONSE MANAGING TABLE

| RESPONSE DESTINATION OBJECT NAME | UPPER CONTROL OBJECT |
|---|---|

Fig.7C

FINAL RESPONSE MANAGING TABLE

| RESPONSE DESTINATION OBJECT NAME | UPPER CONTROL OBJECT |
|---|---|
| MESSAGE DESTINATION OBJECT NAME | OBJECT-B |
| | OBJECT-C |

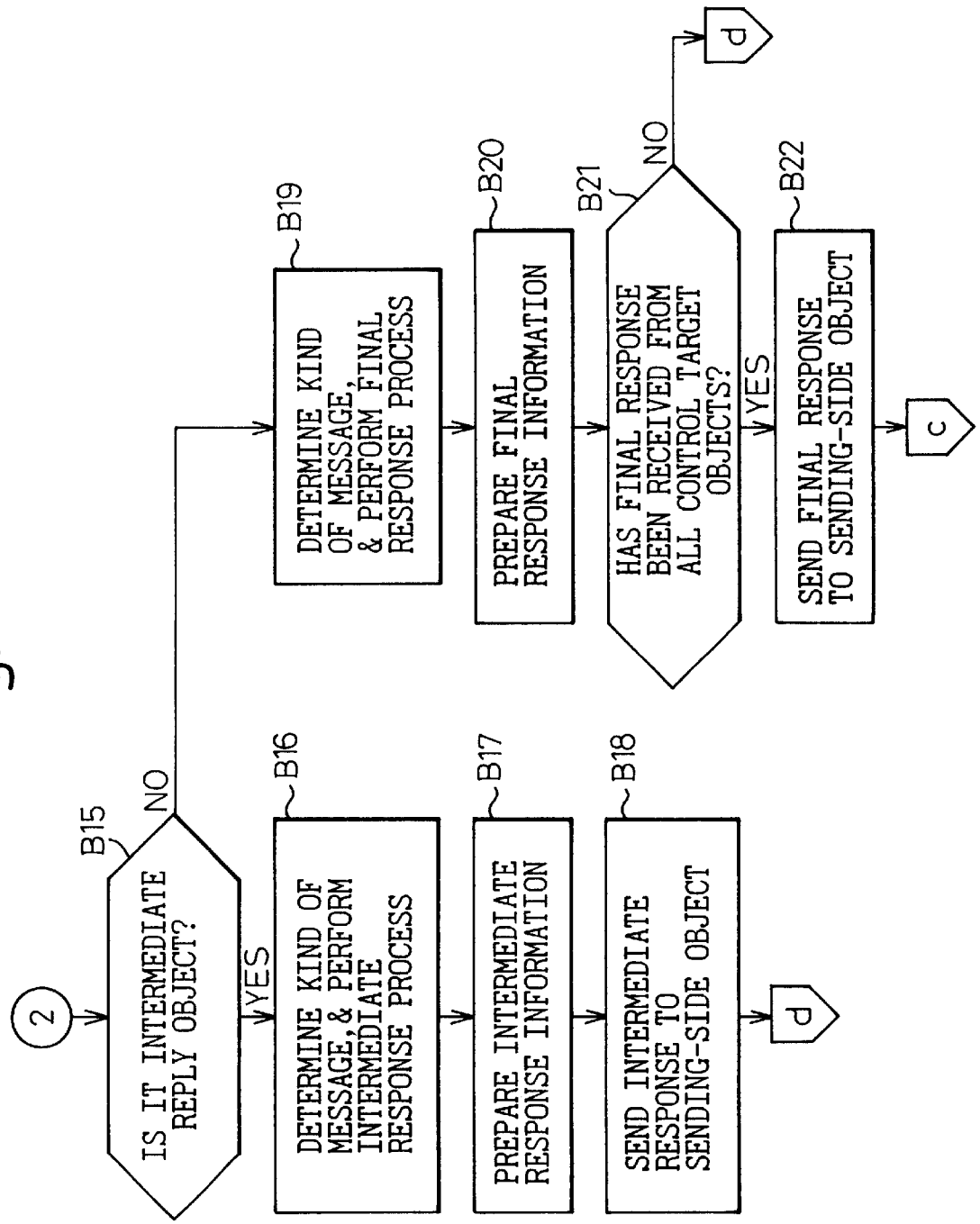

Fig.18A

| HEADER INFORMATION | | |
|---|---|---|
| PROCESS IDENTIFIER | SENDING-SIDE OBJECT NAME | DESTINATION OBJECT NAME | OTHER COMMUNICATION INFORMATION |

Fig.18B

| PARAMETER INFORMATION | | |
|---|---|---|
| REQUEST ID | INSTANCE ID | CONTROL INFORMATION |

Fig.18C

REQUEST ID MANAGING TABLE

| REQUEST ID | RESPONDING-SIDE OBJECT NAME |
|---|---|
| 1 | UPPER CONTROL OBJECT |
| | |
| | |

Fig.18D

FINAL RESPONSE MANAGING TABLE

| REQUEST ID | MESSAGE DESTINATION OBJECT NAME |
|---|---|
| 1 | OBJECT-B |
| 2 | OBJECT-C |
| | |

Fig.18E

RECEPTION MANAGING TABLE

| REQUEST ID | RECEPTION OBJECT REFERENCE |
|---|---|
| 1 | OBJECT-A |
| (2) | (OBJECT-A) |
| | |

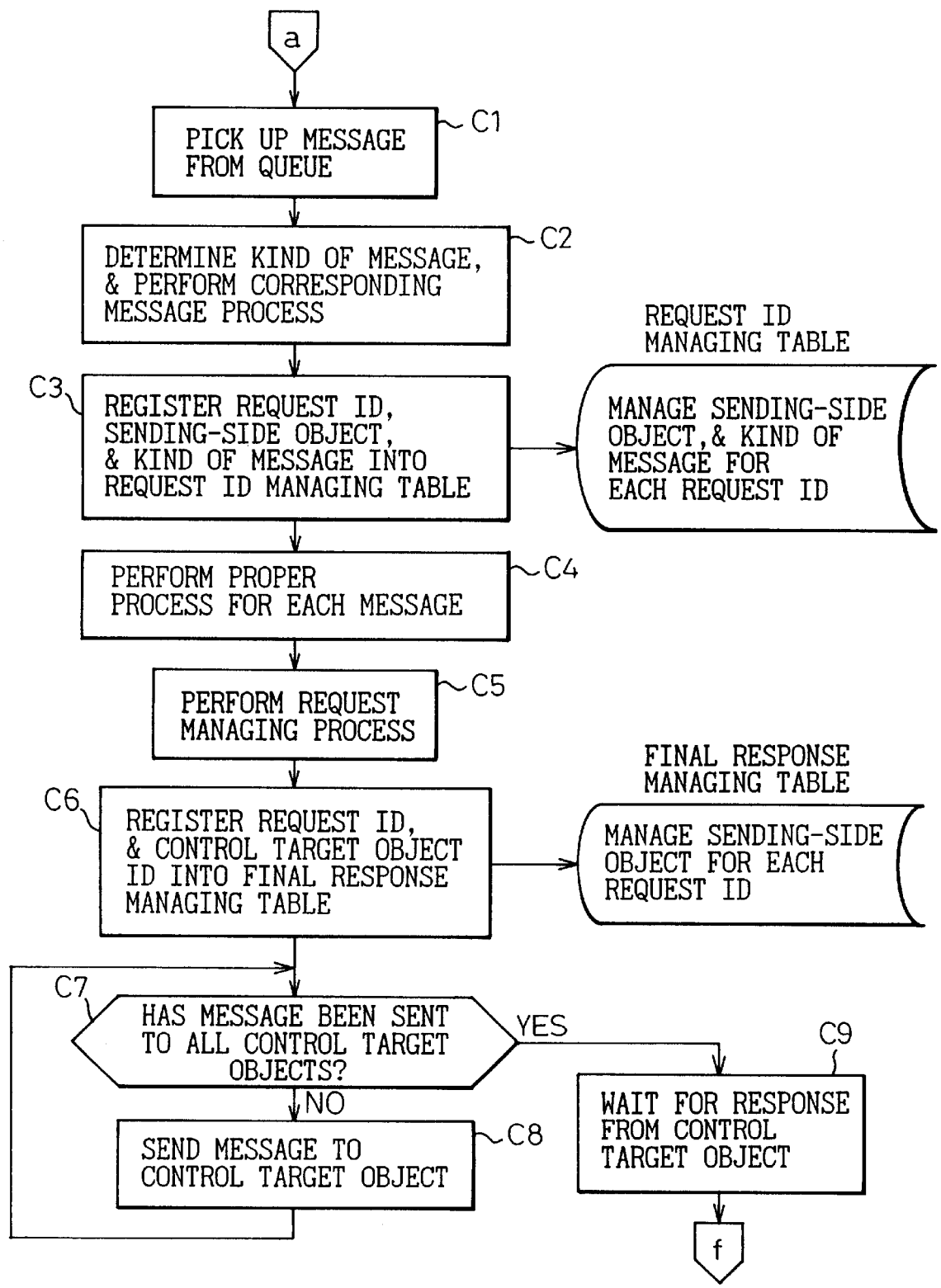

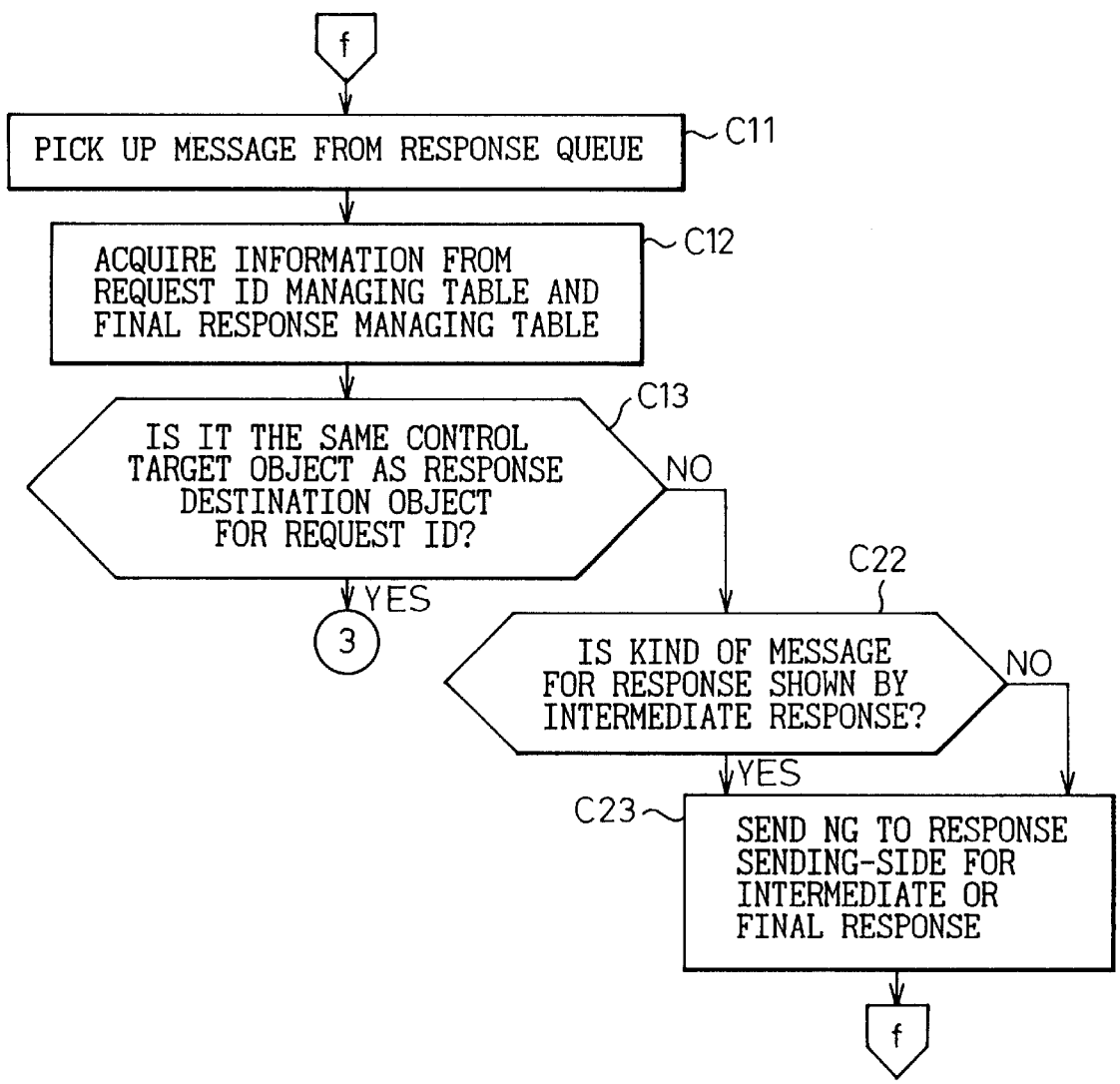

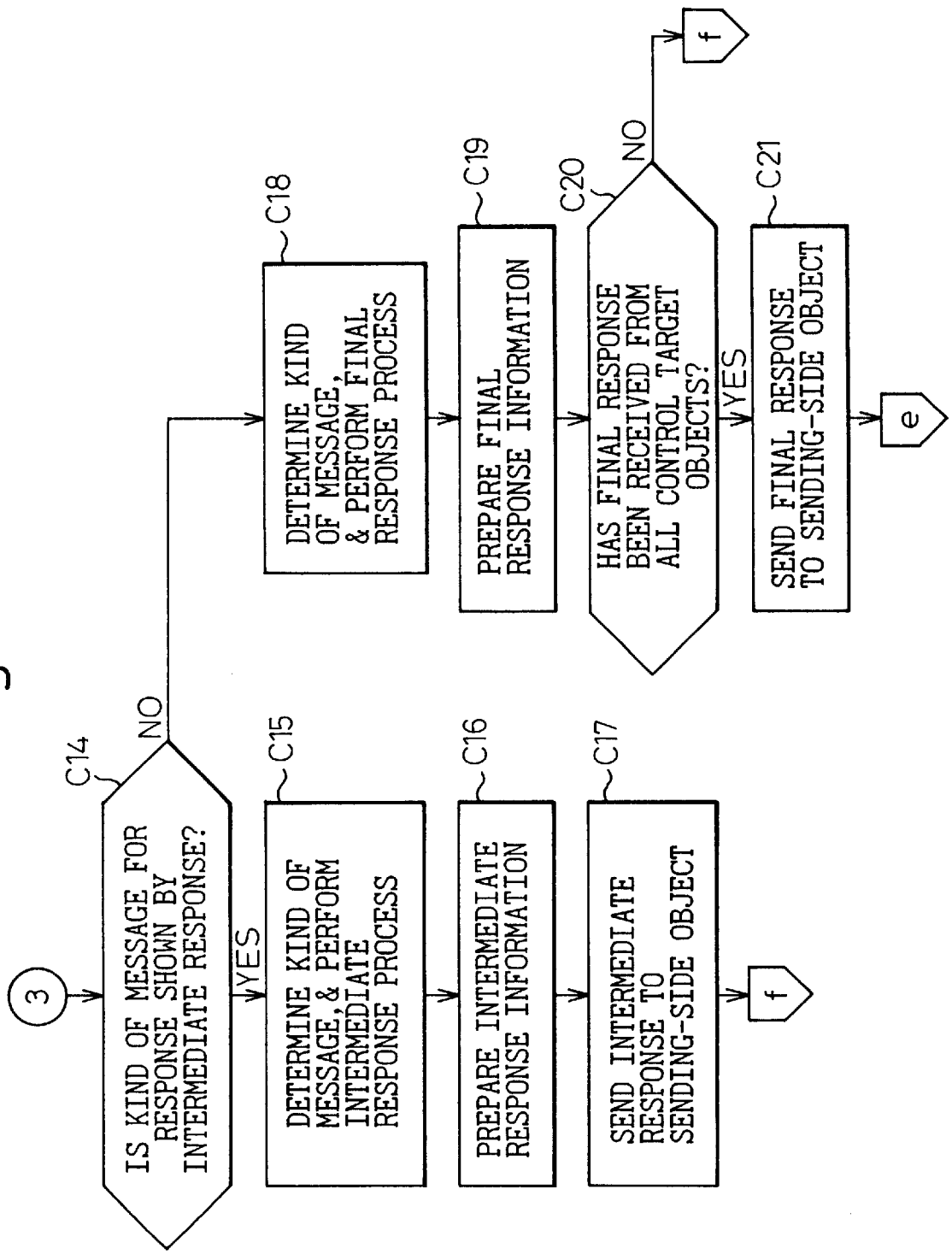

OBJECT-ORIENTED TYPE INFORMATION MANAGING SYSTEM AND A METHOD FOR CONTROLLING MESSAGES BETWEEN OBJECTS IN THE SYSTEM

BACKGROUND OF THE INVENTION

1. Field of the Invention

The present invention relates to an object-oriented type information managing system for managing a network, and a method for controlling messages between objects in the system.

2. Description of the Related Art

Among information managing systems which are applied to telephone exchange systems, data transmission systems, etc., there is a known object-oriented type information managing system which is formed of a plurality of objects and manages a plurality of destination objects in accordance with a request message and response messages between an upper control object and destination objects. In the above system, however, it is desired to realize high speed response between objects, as explained in detail with reference to the attached drawings.

SUMMARY OF THE INVENTION

The primary purpose of the present invention is to provide an object-oriented type information managing system which can realize high speed response between an upper control object and request message destination objects.

Another purpose of the present invention is to provide a method for controlling messages which can realize high speed response between the upper control object and the request message destination objects.

In accordance with a first aspect of the present invention, there is provided an object-oriented type information managing system including a network control system and a network managing system; the network control system including an upper control object; and the network managing system including a plurality of processes each having one or more objects, one object being used as a relay object for receiving a request message from the upper control object, and other objects being used as request message destination objects managed by the relay object and each returning a response message;

wherein at least one process in the plurality of processes comprises a reply object for receiving the response messages sent from the destination objects and directly sending them to the upper control object.

In a preferred embodiment, the reply object comprises an intermediate response processing unit for receiving intermediate response messages sent from the destination objects and sending them to the upper control object, and a final response processing unit for receiving final response messages sent from the destination objects and sending them to the upper control object.

In another preferred embodiment, the reply object further comprises a request ID managing table for managing a response sending-side object based on a request ID for distinguishing the request message; and a final response managing table for managing the destination objects in accordance with the request ID; and wherein these tables are provided within the reply object.

In still another preferred embodiment, the reply object further comprises an intermediate reply object for receiving intermediate response messages sent from the destination objects, and a final reply object for receiving final response messages sent from the destination objects.

In still another preferred embodiment, the intermediate reply object comprises a multi-thread structure consisting of a plurality of threads each of which is provided corresponding to the intermediate response message.

In still another preferred embodiment, a plurality of reply object are provided corresponding to a plurality of request messages when the request messages are sent to the destination objects.

In still another preferred embodiment, a plurality of reply objects are provided corresponding to a plurality of kinds of request messages when the request messages are sent to the destination objects.

In accordance with a second aspect of the present invention, there is provided a method for controlling messages between objects in an object-oriented type information managing system which includes a network control system and a network managing system; the network control system including an upper control object; and the network managing system including a plurality of processes each having one or more objects, one object being used as a relay object for receiving a request message from the upper control object, and other objects being used as request message destination objects managed by the relay object and each returning a response message;

wherein the method comprises steps of; providing a reply object in at least one process in the plurality of processes for receiving the response messages sent from the destination objects and sending them to the upper control object; providing an area for setting a response destination object name in an parameter information contained in the request message; setting a replay object name as the response destination object name of the parameter information; and performing reception process of the response messages, which are sent from the destination objects, in the reply object.

In a preferred embodiment, the method further comprises steps of constituting the reply object by an intermediate reply object and a final reply object; providing an area for setting an intermediate response destination object name into the parameter information for designating the intermediate reply object; providing another area for setting a final response destination object name into the parameter information for designating the final reply object; performing reception process of intermediate response messages, which are sent from the destination objects, in the intermediate reply object; and performing reception process of final response messages, which are sent from the destination objects, in the final reply object.

In another preferred embodiment, the method further comprises steps of setting a request message sending-side object name as the intermediate response destination object name in the parameter information; setting the final reply object name as the final response destination object name in the parameter information; and sending the intermediate response messages from the destination objects to the request message sending-side object, and the final response messages from the destination objects to the request message sending-side object.

In still another preferred embodiment, the method further comprises steps of preparing an intermediate response processing unit having a multithread structure each corresponding to the intermediate response message in the intermediate reply object; and performing reception process of the intermediate response messages from the destination objects.

In still another preferred embodiment, the method further comprises steps of preparing a plurality of intermediate reply objects and final reply objects each of which is provided corresponding to kinds of the request messages; and sending the intermediate response messages and the final response messages from the destination objects to the intermediate reply object and the final reply object.

BRIEF DESCRIPTION OF THE DRAWINGS

FIG. 2A shows a header information of a request message, FIG. 2B shows a parameter information of the request message, FIG. 2C shows a request ID managing table, and FIG. 2D shows a final response managing table;

FIGS. 4A and 4B are flowcharts for explaining the message process in a reply object according to the first embodiment of the present invention;

FIG. 7A shows a parameter information of the request message, FIG. 7B shows an intermediate response managing table, and FIG. 7C shows a final response managing table;

FIGS. 9A and 9B are flowcharts for explaining the message process in an intermediate reply object and a final reply object according to the third embodiment of the present invention;

FIG. 18A shows a header information of the request message, FIG. 18B shows a parameter information of the request message, FIG. 18C shows a request ID managing table, FIG. 18D shows a final response managing table, and FIG. 18E shows a reception managing table; and FIG. 19 is a flowchart for explaining a conventional message process; and FIGS. 20A and 20B are flowcharts for explaining another conventional message process.

DESCRIPTION OF THE PREFERRED EMBODIMENTS

Before describing the preferred embodiments of the present invention, a basic structure of an information managing system, and conventional arts including their problems, will be explained in detail with reference to the attached drawings.

Figure 16:
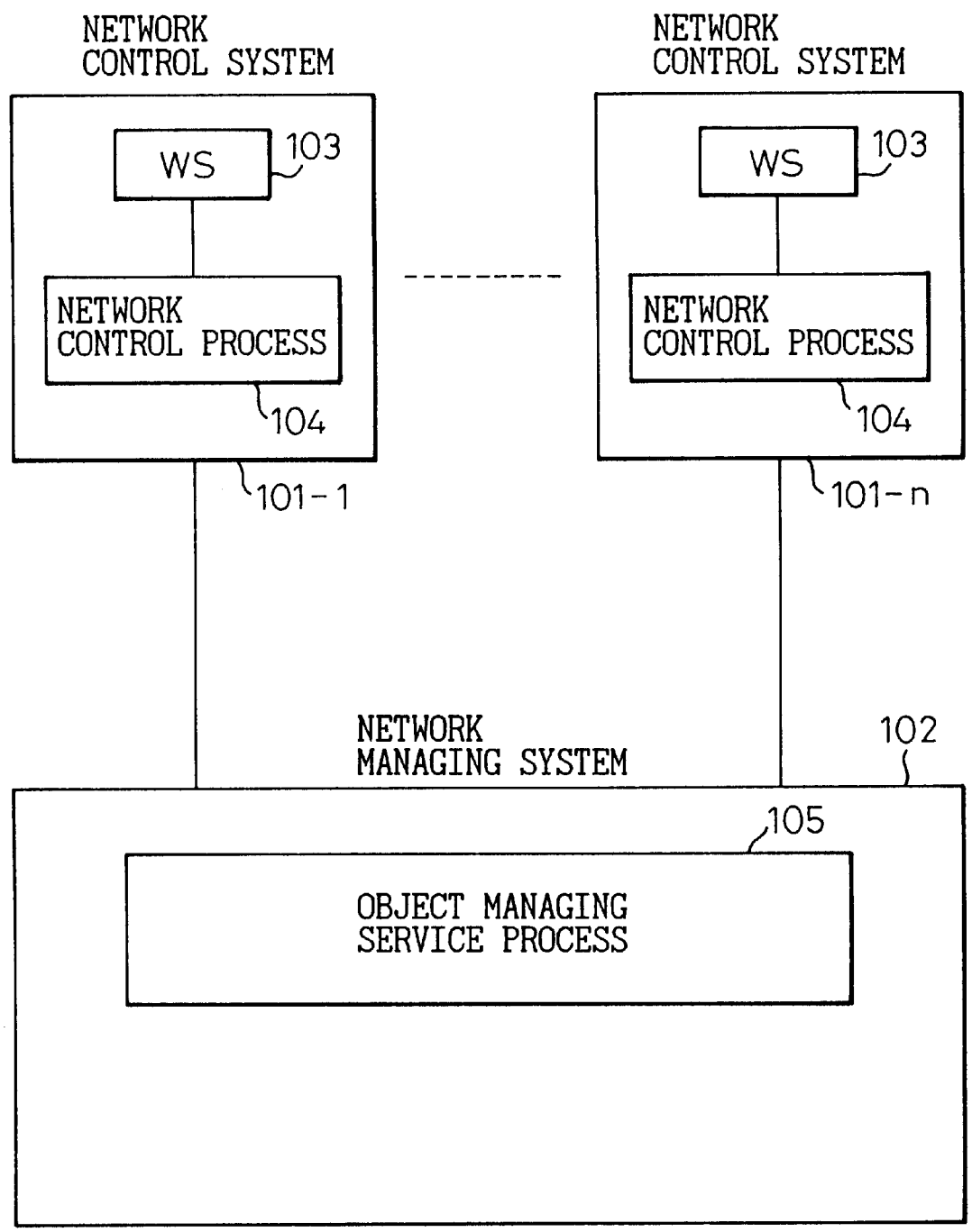
FIG. 16 is an explanatory view of the information managing system including a plurality of network control systems and a network managing system.

FIG. 16 is an explanatory view of an information managing system which includes a plurality of network control systems 101-1 to 101-n and a network managing system 102. Each network control system 101-1 to 101-n includes an exchange function which includes a control terminal (for example, a work station (WS)) 103 and a network control process 104. Further, the network managing system 102 includes an object managing service process 105.

When the control terminal 103 requests the information to the network managing system 102 in accordance with, for example, a GET (as mentioned below, this is a kind of request message) operation, the network control process 104 sends a request message to the network managing system 102. The object managing service process 105 in the network managing system 102 performs a predetermined process in accordance with the request message, and returns a response message to the network control process 104. When the response message is long, it is divided into a plurality of intermediate response messages. The object managing process 105 returns each intermediate message and finally sends a final response message to the network control process 104.

Figure 17:
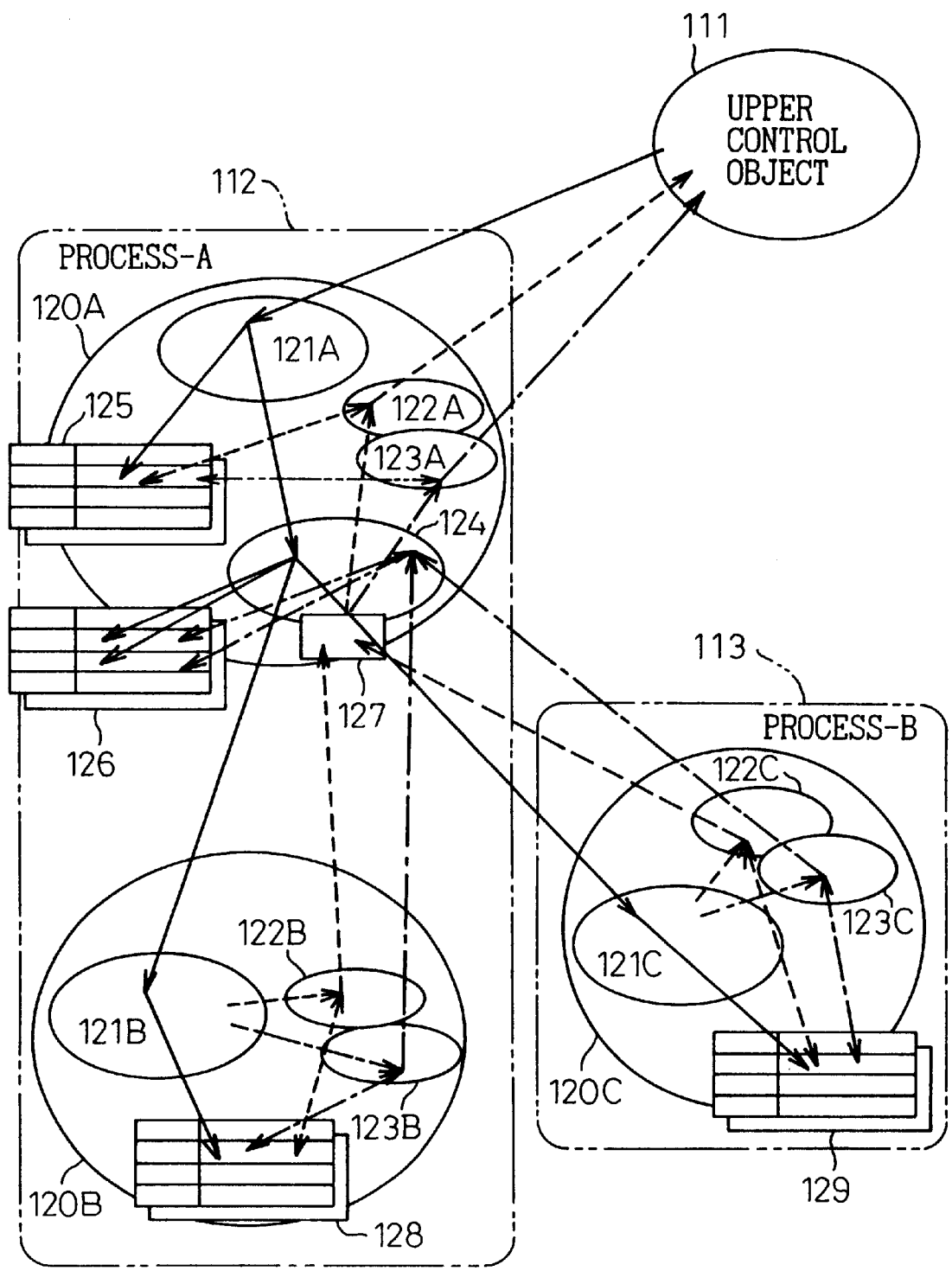
FIG. 17 is an explanatory view of a conventional art.

FIG. 17 is an explanatory view of a conventional art which includes an upper control object 111, a process-A (112) including an object-A (120A) and an object-B (120B), and a process-B (113) including an object-C (120C). In the process A (112) and process-B (113); 121A to 121C denote message processing units; 122A to 122C denote intermediate response processing units; 123A to 123C denote final response processing units; 124 denotes a request ID managing unit; 125 denotes a request ID managing table; 126 denotes a final response managing tale; 127 denotes a buffer memory; and 128 and 129 denote reception managing tables.

The upper control object 111 corresponds to, for example, each network control system 101-1 to 101-n in FIG. 16, and each process-A (112) and -B (113) corresponds to the network managing system 102 in FIG. 16. Further, the upper control object 111 sends the request message to the object-A (120A), and the object-A (120A) sends the request message to the object-B (120B) and the object-C (120C), which are managed by the object-A (120A), through the request ID managing unit.

As mentioned above, in general, the response message is returned to the object which sends the request message. Accordingly, in the objects-A, -B and -C shown in FIG. 17, the response message is returned to the object which sends the request message. In FIG. 17, arrows, each of which is indicated by a solid line, represent the request message. Further, arrows, each of which is indicated by a dotted line, represent the intermediate response message. Still further, arrows, each of which is indicated by a chain-dotted line, represent the final response message.

FIG. 18A shows a header information of the request message, FIG. 18B shows a parameter information of the request message, FIG. 18C shows a request ID managing table, FIG. 18D shows a final response managing table, and FIG. 18E shows a reception managing table.

As shown in FIG. 18A, the header information includes a process identifier, a sending-side object name, a destination object name, and other communication information including parameters. As shown in FIG. 18B, the parameter information includes a request ID, an instance ID and control information. Accordingly, either the upper control object 111 or its object ID is set to an area of the sending-side object name in the request message from the upper control object 111. On the other hand, either the object-A or its object ID is set to an area of the destination object name. In the following explanations, the object name includes either a title or the object ID.

The message processing unit A (121A) in the object-A (120A) extracts the request ID in the parameter information in the request message, extracts the sending-side object name in the header information, and stores the extracted request ID and the destination object name into the request ID managing table 125. For example, when the request ID is "1", and when the sending-side object name represents the upper control object 111, since the response message should be returned to the upper control object 111, for example, as shown in FIG. 18C, "1" is stored as the request ID, and the upper control object is stored as a responding-side object name.

Further, when the message processing unit 121A recognizes sending of the request message to the processes-B (112) and -C (113) based on the parameter information in the request message, the message processing unit 121A sets the title of the object-A to the area of the sending-side object name in the header information, and the titles of the objects-B and -C to the area of the destination object name, sends the request message to the objects-B and -C, and stores the request ID and the destination object name into the final response managing table 126. For example, when the request ID of the request message which is sent to the object-B is §11, and when the request ID of the request message which is sent to the object-C is "2", as shown in FIG. 18D, the title of the object-B corresponding to the request ID=1 and the title of the object-C corresponding to the request ID=2, are stored as the destination object name of the message.

The object-B performs reception process of the request message in the message processing unit 121B, and stores the request ID and the reception object reference into the reception managing table 128. Similarly, the object-C performs reception process of the request message in the message processing unit 121C, and stores the request ID and the reception object reference into the reception managing table 129.

In the reception managing table shown in FIG. 18E, the object-A corresponding to the request ID=1 is stored as the reception object reference in the case of the reception managing table 128 of the object-B, and the object-A corresponding to the request ID=2 is stored as the reception object reference in the case of the reception managing table 129 of the object-C as shown within a parenthesis in the table.

In the objects-B and -C, when the response message becomes long, the divided intermediate response message is processed in the intermediate response processing units 122B and 122C. The end of the response message is processed as the final response message in the final response processing units 123B and 123C. In these cases, the intermediate response processing units 122B and 122C and the final response processing units 123B and 123C refer to the reception managing tables 128 and 129 based on the request ID, and send either the intermediate response message or the final response message to the object based on the reception object reference. The request ID and the final response flag are added to the final response message.

The object-A receives the intermediate response messages from the objects-B and -C, and accumulates them in the buffer 127. When the object-A receives the final response messages from the objects-B and -C, the object-A verify the request ID and the sending-side object name with the request ID and the responding-side object name stored in the final response managing table 126. When the former coincide with the latter, the object A determines the message as the final response message for the intermediate response message accumulated in the buffer 127, and sends the intermediate response message accumulated in the buffer 127 and the final response message finally received thereby to the upper control object 111 of the responding-side object. These processes are performed in the intermediate response processing 122A and the final response processing unit 123A.

FIG. 19 is a flowchart for explaining a conventional message process, and FIGS. 20A and 20B are flowcharts for explaining another conventional message process. In these drawings, steps (C1) to (C4) explain processes in the message processing unit 121A; steps (C5) to (C9), (C11) to (C14), (C22) and (C23) explain processes in the request ID managing unit 124; steps (C15) to (C17) explain process in the intermediate response processing unit 122A; and steps (C18) to (C21) explain process in the final response processing unit 123A.

In FIG. 19, the message processing unit 121A in the object-A of the process A includes a queue for receiving the message, picks up the message from the queue (C1), detects a kind of the message, and performs a predetermined process corresponding to the kind of the message (C2). Further, the message processing unit 121A registers the request ID, the sending-side object, and the kind of the message into the request ID managing table 125 (C3), and performs a proper process for each message, for example, reference of database, reference of internal data, etc. (C4). The responding-side object name is registered into the request managing table 125 corresponding to each request ID as shown in FIG. 18C.

The request ID managing unit 124 performs the request managing process (C5), and registers the request ID and the control target object ID into the final response managing table 126 (C6). The message destination object name is registered into the final response managing table 126 corresponding to each request ID as shown in FIG. 18D.

Further, the request ID managing unit 124 determines whether the message has been sent to all control target objects (C7). If the message is not sent (NO), the request ID managing unit 124 sends the message to the control target object (C8), and the process is returned to the step C7. When the message is sent (YES), the request ID managing unit 124 waits for the response from the control target object (C9).

In FIGS. 20A and 20B, when the request ID managing unit 124 receives the response message from the control target object, it picks up the message from the response queue (C11), and acquires the information from the request ID managing table 125 and the final response managing table 126 (C12). For the response request ID, the request ID managing unit 124 determines whether the control target object (the message destination object name) in the final response managing table is the same as the destination object (C13). That is, the request ID managing unit 124 refers to the final response managing table 126, and determines whether the message destination object name (the control target object name) corresponding to the request ID is the same as the sending-side object name (the control target object name) in the responded message.

When the message destination object name is the same as the message sending-side object name, the request ID managing unit 124 determines whether this response message is the intermediate response message or the final response message (C14) since this is the correct response message. For example, this can be detected by the presence/absence of a final response flag. Further, when it is the intermediate response message, the intermediate response processing unit 122A detects the kind of the message, performs the corresponding intermediate response process (C15), prepares the intermediate response information, and sends the intermediate response to the sending-side object (C17). In this case, the intermediate response processing unit 122A sends the intermediate response to the upper control object 111.

When the response message is the final response message, the final response processing unit 123A detects the kind of the message, performs the corresponding final response process (C18), prepares the final response information (C19), and determines whether the final response has been received from all control target objects (C20). When all receptions are not completed, the process is returned to the step (C11). When all receptions are completed, the final response processing unit 123A sends the final response to the sending-side object (C21). That is, the final response processing unit 123A sends the final response to the upper control object 111.

Further, when the message destination object name is not the message sending-side object name, the request ID managing unit 124 determines whether the response is the intermediate response or the final response (C22), and go sends "NG" to each sending-side (C23). As a result, it is possible to control the response so as not to produce an error in the intermediate response and the final response sent from the control target object.

There are, however, the following problems in the above-explained conventional art. That is, in the message control between the objects in the conventional object-oriented information managing system, as mentioned above, when the object-A sends the request message from the upper control object 111 to the objects B and C, the intermediate response processing unit 122A and the final response processing unit 123A in the object-A receive the intermediate response message and the final response message from the objects-B and -C, confirm an adjustment of the response message with the request message from the upper control object 111, and send the received intermediate response message and the final response message to the upper control object 111.

In this case, however, in the object A, when the next request message of the request ID=b is sent from the upper control object 111 to the objects-B and -C before receiving the final response message of the request ID=a from the objects-B and -C as to the request message of the request ID=a from the upper control object 111, the response messages of the request ID=a, b are received in mixed state so that the process becomes complicated in the object-A and the possibility of the occurrence of an error becomes large. Accordingly, as mentioned above, after confirmation of the final response message for the request message of a certain request ID, the request message of the next request ID must be sent to the objects-B and -C.

As a result, in the object-A which sends the request message to a plurality of objects-B and -C, the sending of the next request message is held until the reception of the final response message from the objects-B and -C can be confirmed in the object-A. Further, when there are many messages between the object-A and the objects B and C, the waiting time for the next request message becomes longer in the object-A so that the response time to the upper control object 111 is delayed.

Accordingly, the present invention aims to solve the above problems in the conventional art, and to realize high speed response to the request message sent from the upper control object to the destination objects.

Figure 1:
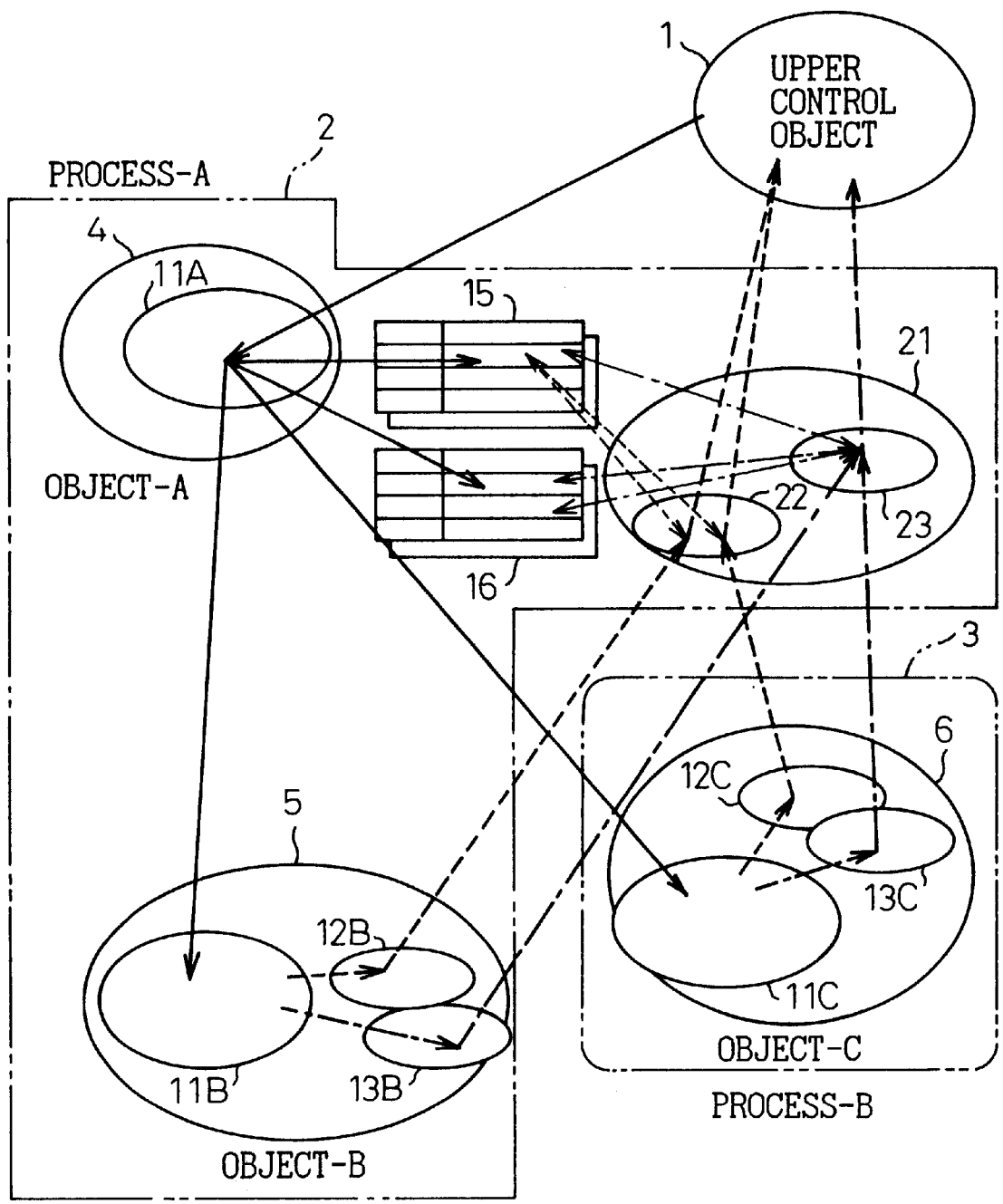
FIG. 1 is an explanatory view of an information managing system according to a first embodiment of the present invention.

FIG. 1 is an explanatory view of an information managing system according to a first embodiment of the present invention. Reference number 1 is an upper control object; 2 is a process-A; 3 is a process-B; 4 to 6 are objects A to -C; 21 is a reply object; 11A to 11C are message processing units; 12B, 12C and 22 are intermediate response processing units; 13B, 13C and 23 are final response processing units; 15 is a request ID managing table; and 16 is a final response managing table. In the present invention, the object A is called "relay object" since this object receives a request message from the upper control object 1 and sends it to the destination objects, i.e., the objects B and C to be controlled as the target objects (i.e., control target objects).

Further, each solid line having an arrow denotes the flow of the request message, each dotted-line having the arrow denotes the flow of the intermediate response message, and each chain-dotted line having the arrow denotes the flow of the final response message.

In this embodiment, the process-A includes the objects-A, -B and the reply object 21. The process-B includes the object-C. The reply object 21 includes an intermediate response processing unit 22 and a final response processing unit 23. The reply object 21 is a particular object provided for receiving and processing the intermediate response messages and the final response messages from the request message destination objects-B and -C. The objects-B and -C include message processing units 11B and 11C, intermediate response processing units 12B and 12C, and final response processing units 13B and 13C, as well as the conventional art. Further, the objects-B and -C include a reception managing table (not shown). In this embodiment, the request ID managing table 15 and the final response managing table 16 are provided for an outside of the reply object 21.

FIG. 2A shows a header information contained in the request message, FIG. 2B shows a parameter information contained in the request message, FIG. 2C shows a request ID managing table, and FIG. 2D shows a final response managing table.

As shown in FIGS. 2A and 2B, the header information includes a process identifier, a sending-side object name, a destination object name and other communication information. The parameter information includes a request ID, an instance ID, a control information and a response destination object name. That is, an area for the response destination object name is added to the conventional parameter information shown in FIG. 18B. Further, when the request message is sent from the upper control object 1 to the object-A, the sending-side object name is set to the upper control object, the destination object name is set into the object-A, and the responding-side object name of the parameter information is set into the upper control object.

The message processing unit 11A of the object-A extracts the request ID and the response destination object name in the request message sent from the upper control object 1, and stores them into the request managing table. In this case, as shown in FIG. 2C, the request ID is set to "1" and the response destination object name is set to the upper control object in the request ID managing table.

The message processing unit 11A processes the request message from the upper control object 1, and sends it to the objects-B and -C which are managed by the object A (i.e., relay object). In this case, the message processing unit 11A acquires the object ID of the reply object 21, and sets either the reply object name or its object ID as the response destination object name of the parameter information in the request message.

As the request ID of the request message sent from the object-A to the objects-B and -C, for example, when the request ID sent from the object-A to the object-B is set to "1" and when the request ID sent from the object-A to the object-C is set to "2", the request ID is set to "1" and the message destination object name is set to either the object-B or the object ID in the final response managing table as shown in FIG. 2D. Further, the request ID is set to "2" and the message destination object name is set to either the object-C or the object ID in the final response managing table as shown in FIG. 2D.

Each message processing unit 11B and 11C in each object-B and -C receives the request message from the object-A, and stores the reply object name into the reception managing table (not shown) as the response destination object name of the parameter information. After above processes, the intermediate response message to the request message is sent from each intermediate response processing unit 12B and 12C to the reply object 21, and the reply object 21 receives the intermediate response message in the intermediate response processing unit 22. The final response message is sent from each final response processing unit 13B and 13C to the reply object 21, and the reply object 21 receives the final response message in the final response processing unit 23.

The intermediate response processing unit 22 in the reply object 21 refers to the request ID managing table 15 as to the intermediate response message from each intermediate response processing unit 12B and 12C in each object B and C. When the request ID is "1", the intermediate response processing unit 22 sends the intermediate response message to the upper control object 1 which is provided as the response destination object. Further, the final response processing unit 23 in the reply object 21 verifies the final response message from each final response processing unit 13B and 13C with the contents in the request ID managing table 15 and the final response managing table 16. For example, when the final response processing unit 23 receives the final response message of the request ID=1 from the object B and when the final response processing unit 23 receives the final response message of the request ID=2 from the object C, the final response processing unit 23 determines these messages as the reception of the final response message to the request message from the upper control object 1, and sends the final response message to the upper control object 1.

Accordingly, since the particular object, i.e., the reply object 21, is provided for receiving the intermediate response messages and the final response messages from the destination objects-B and -C, the object-A can send the next request message from the upper control object to the destination objects, i.e., the objects-B and -C, even if the object-A does not confirm reception of the final response messages sent from the objects-B and -C for the previous request message. As a result, it is possible to realize high speed response between the upper control object and the destination objects.

Figure 3:
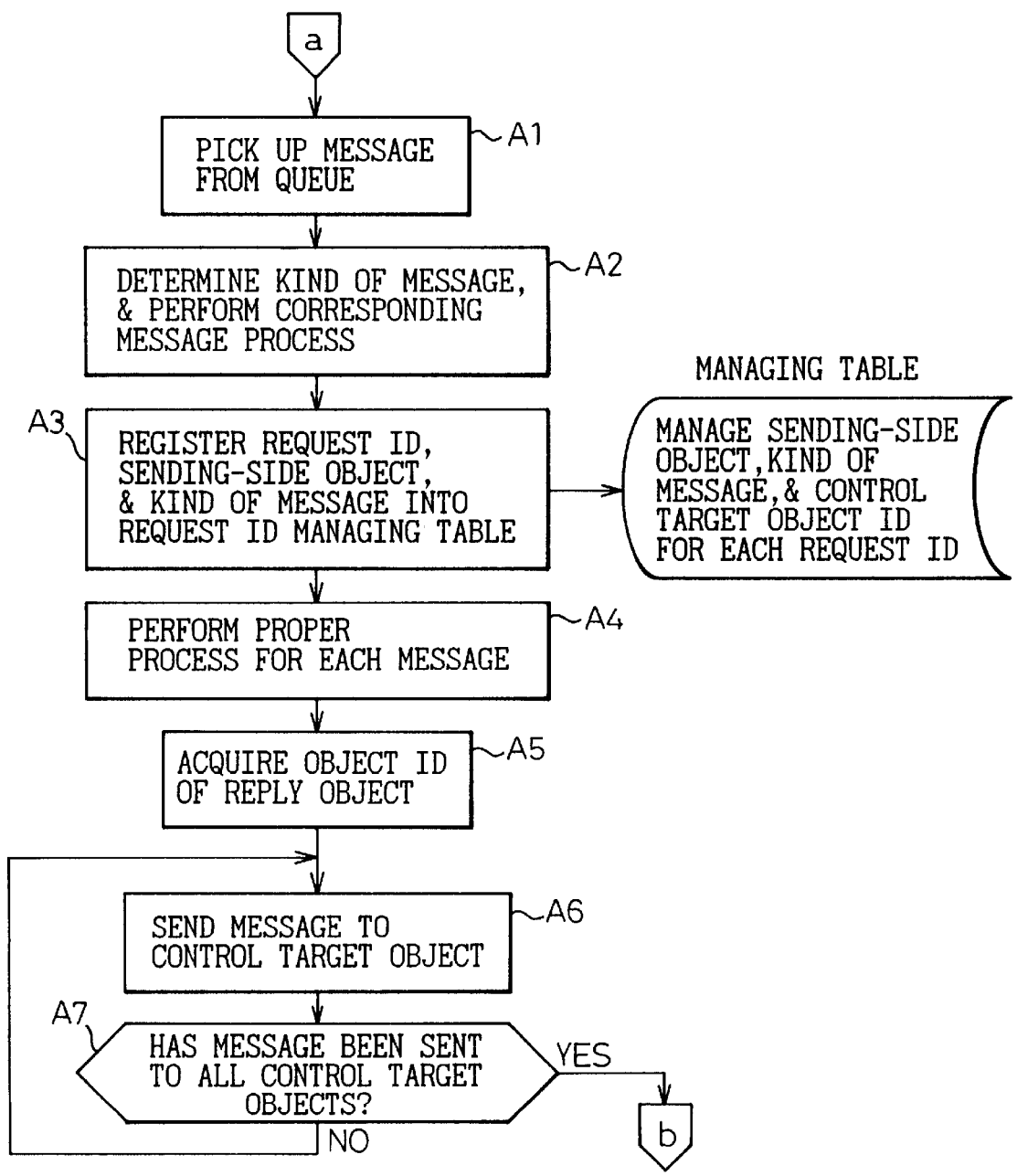
FIG. 3 is a flowchart for explaining the message process in an object A according to the first embodiment of the present invention.

FIG. 3 is a flowchart for explaining a message process in the object A according to a first embodiment of the present invention, and FIG. 4 is a flowchart for explaining a message process in the reply object 21 according to the first embodiment of the present invention.

In FIG. 3, the message processing unit 11A in the object-A picks up the message from the queue (A1), detects the kind of the message, and performs the corresponding message process (A2). Further, the message processing unit 11A registers the request ID, the sending-side object and the kind of the message into the request ID managing table 15 (A3). Further, the sending-side object, the kind of the message and the control target object (the destination object of the request message from the upper control object) are managed for each request ID in the request ID managing table 15 and the final response managing table 16.

Further, the message processing unit 11A performs proper processes for each message, for example, reference of the database, reference of the internal data, etc. (A4), and acquires the object ID of the reply object 21 (A5). The object ID of the reply object 21 is sent to the control target object as the response destination object name of the parameter information in the message to be sent (A6). Further, the message processing unit 11A determines whether the object ID has been sent to all control target objects (for example, objects B and C in FIG. 1) (A7). When the object ID is not sent to all control target objects, the process returns to the step A6, and the message processing unit 11A continues sending of the message to the control target objects.

Figure 4A:
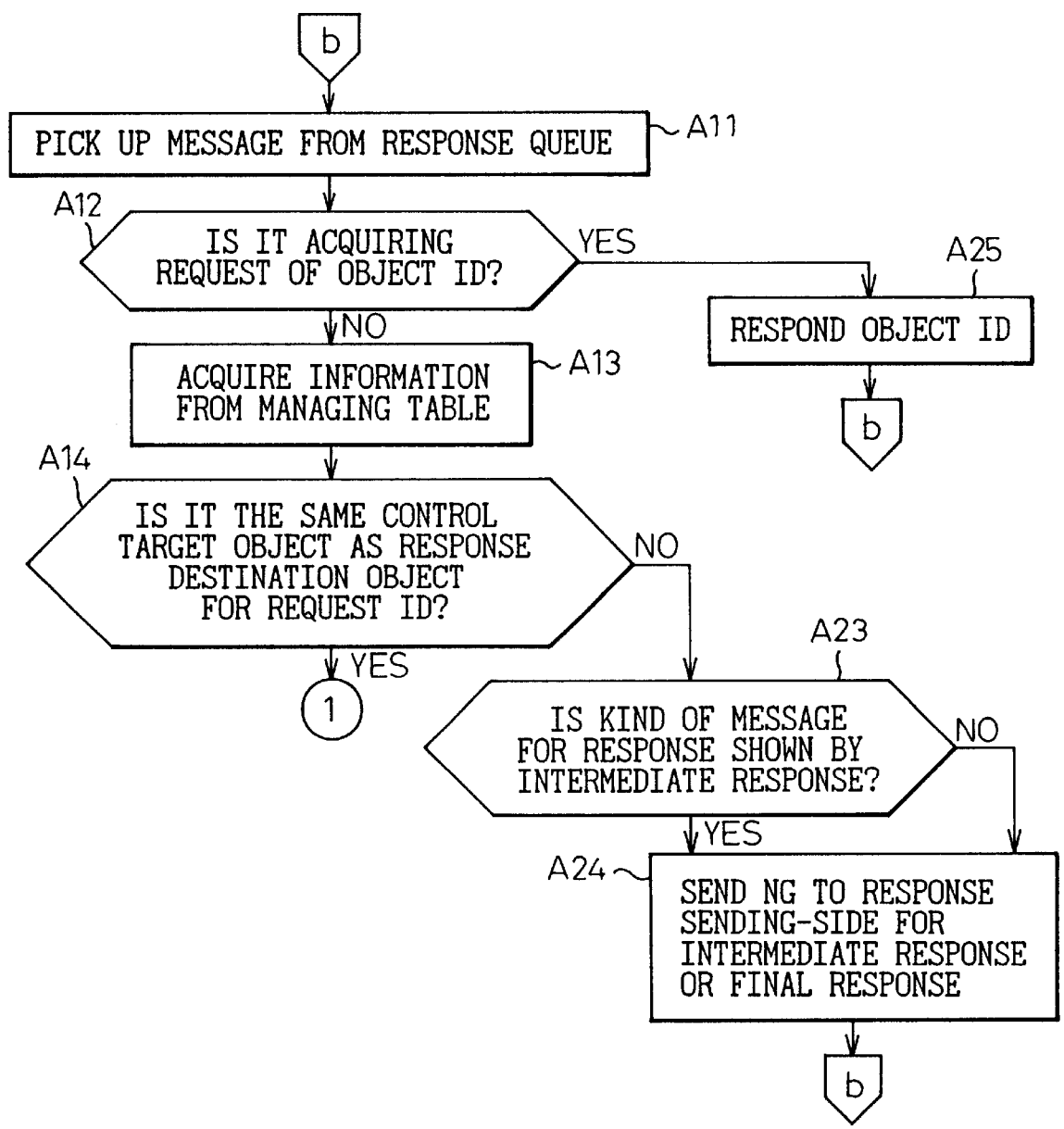

In FIGS. 4A and 4B, when the reply object 21 receives the response message from the control target object, it picks up the response message from the response queue (A11), and determines whether it is an acquiring request of the object ID (A12). When it is the acquiring request of the object ID, the reply object 21 responds the request object ID (A25). When it is not acquiring request of the object ID, the reply object 21 acquires the information from the managing table.

Further, the reply object 21 determines whether the control target object name (i.e., message destination object name) corresponding to the request ID in the final response managing table 16 coincides with the destination object name of the response message (A14). When the former coincides with the latter, the reply object 21 determines the message as the correct response, and further determines whether the kind of the message of this response is the intermediate response or the final response (A15).

When it is the intermediate response, the intermediate response processing unit 22 detects the kind of the message, performs the corresponding intermediate response (A16), prepares the intermediate response information (A17), and sends the intermediate response to the sending-side object (A18). As shown in FIG. 1, the intermediate response processing unit 22 sends the intermediate response to the upper control object 1.

When the message is the final response, the final response processing unit 23 detects the kind of the message, performs the corresponding final response process (A19), prepares the final response information (A20), and determines whether all final responses have been received from all control target objects (i.e., objects B and C in FIG. 1) (A21). When all response messages are received, the final response processing unit 23 sends the final response to the sending-side object (A22). In FIG. 1, the final response processing unit 23 refers to the request ID managing table 15, and sends the final response to the upper control object 1. When any response is not received, the process returns to the step A11.

Further, in step A14, when the message destination object name corresponding to the request ID in the final response managing table 16 does not coincide with the destination object name of the response message, the final response processing unit 23 determines whether the kind of the response message is the intermediate response or the final response (A23), the final response processing unit 23 sends "NG" to the response destination for the intermediate or the final response (A24).

As explained above, since the response process in the reply object is not performed in the object A, it is possible to sequentially send the request message to the objects B and C in the object A so that it is possible to improve the responsibility between the objects.

Figure 5:
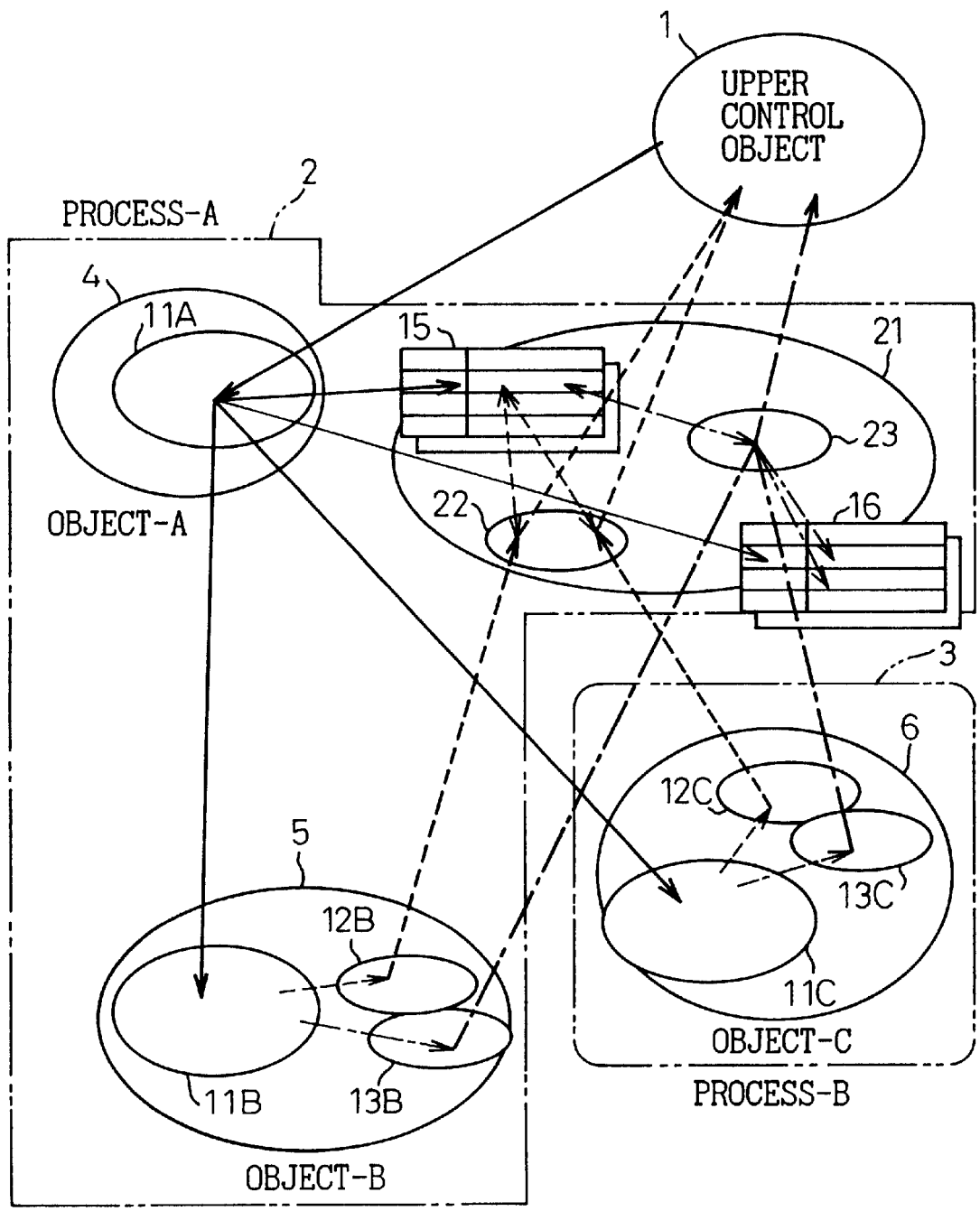
FIG. 5 is an explanatory view of the information managing system according to a second embodiment of the present invention.

FIG. 5 is an explanatory view of the information managing system according to a second embodiment of the present invention. The same reference numbers used in FIG. 1 are attached to the same components. As shown in FIG. 5, the request ID managing table 15 and the final response managing table 16 are provided for an inside of the reply object 21. Each solid line having the arrow denotes flow of the request message, the dotted-line having the arrow denotes flow of the intermediate response message, and the chain-dotted line having the arrow denotes flow of the final response message.

In the second embodiment, the message processing unit 11A in the object-A acquires the object ID of the reply object 21 in the request message from the upper control object 1, and sets the object ID to the response destination object name of the parameter information as the response destination object of the request message to be sent to the objects-B and -C. Further, at that time, the message processing unit 11A sets the request ID and the upper control object name, and the request ID and the object name B or C, into the request ID managing table 15 and the final response managing table 16.

Accordingly, as well as the first embodiment, before the object-A receives the final response message for the request message, the object-A can start to process the next request message. Further, the reply object 21 includes the request ID managing table 15 and the final response managing table 16 so that it is possible to improve reusablility of the reply object 21 because the information in the managing tables appear to be shaded in the reply object 21.

Figure 6:
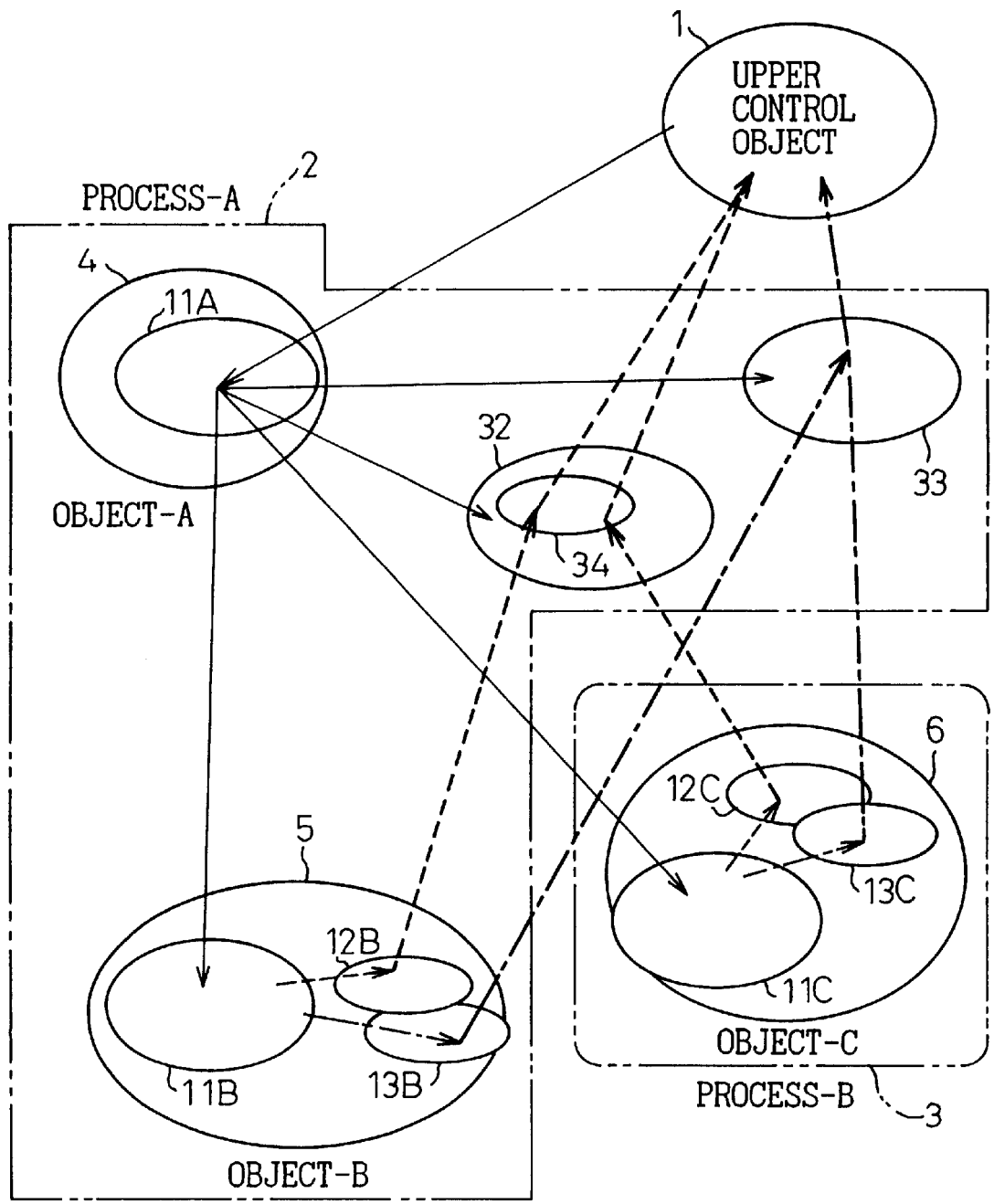
FIG. 6 is an explanatory view of the information managing system according to a third embodiment of the present invention.

FIG. 6 is an explanatory view of an information managing system according to a third embodiment of the present invention. The same reference numbers used in FIG. 1 are attached to the same components. In FIG. 6, 32 is an intermediate reply object, 33 is a final reply object, and 34 is an intermediate response managing unit. In this embodiment, the reply object 21 (see FIGS. 1 and 5) is divided into the intermediate reply object 32 and the final reply object 33. In this case, the request ID managing table 15 and the final response managing table 16 are omitted in this drawing.

The message processing unit 11A in the object A receives the request message from the upper control object 1, acquires the object ID of the intermediate reply object 32 and the final reply object 33, and adds the intermediate response destination object name in the parameter information and the final response destination object name to be sent to the objects B and C.

Each message processing unit 11B and 11C in each object-B and -C performs the processes in accordance with the request message, sends the intermediate response message to the object based on the intermediate response destination object name from the intermediate response processing units 12B and 12C, and sends the final response message to the object based on the final responding-side object name from the final response processing units 13B and 13C.

FIG. 7A shows a parameter information of the request message, FIG. 7B shows an intermediate response managing table, and FIG. 7C shows a final response managing table.

As shown in FIG. 7A, the parameter information of the request message, which is sent from the message processing unit 11A to each object-B and -C, includes a request ID, an instance ID, a control information, an intermediate response destination object name, and a final response destination object name. Each intermediate response processing unit 12B and 12C in each object-B and -C sends the intermediate response message to the intermediate reply object 32 as the intermediate response destination object designated by the parameter information.

The intermediate response managing unit 34 in the intermediate reply object 32 refers to the request ID managing table (not shown), and relays the intermediate response message to the upper control object 1 as the response destination object name. Each final response processing unit 13B and 13C sends the final response message to the final reply object 33 which is designated by the parameter as the final response destination object. The final reply object 33 refers to the final response managing table (not shown), and sends the final response message to the upper control object 1 as the response destination object name.

Accordingly, the intermediate response message, which is sent from the objects-B and -C in order to process the request message from the object-A, is processed by the intermediate reply object 32, and the final response message is processed by the final reply object 33. As a result, it is possible to avoid the waiting time for process of the final response message, due to many intermediate response messages, so that it is possible to realize high speed process between objects.

Figure 8:
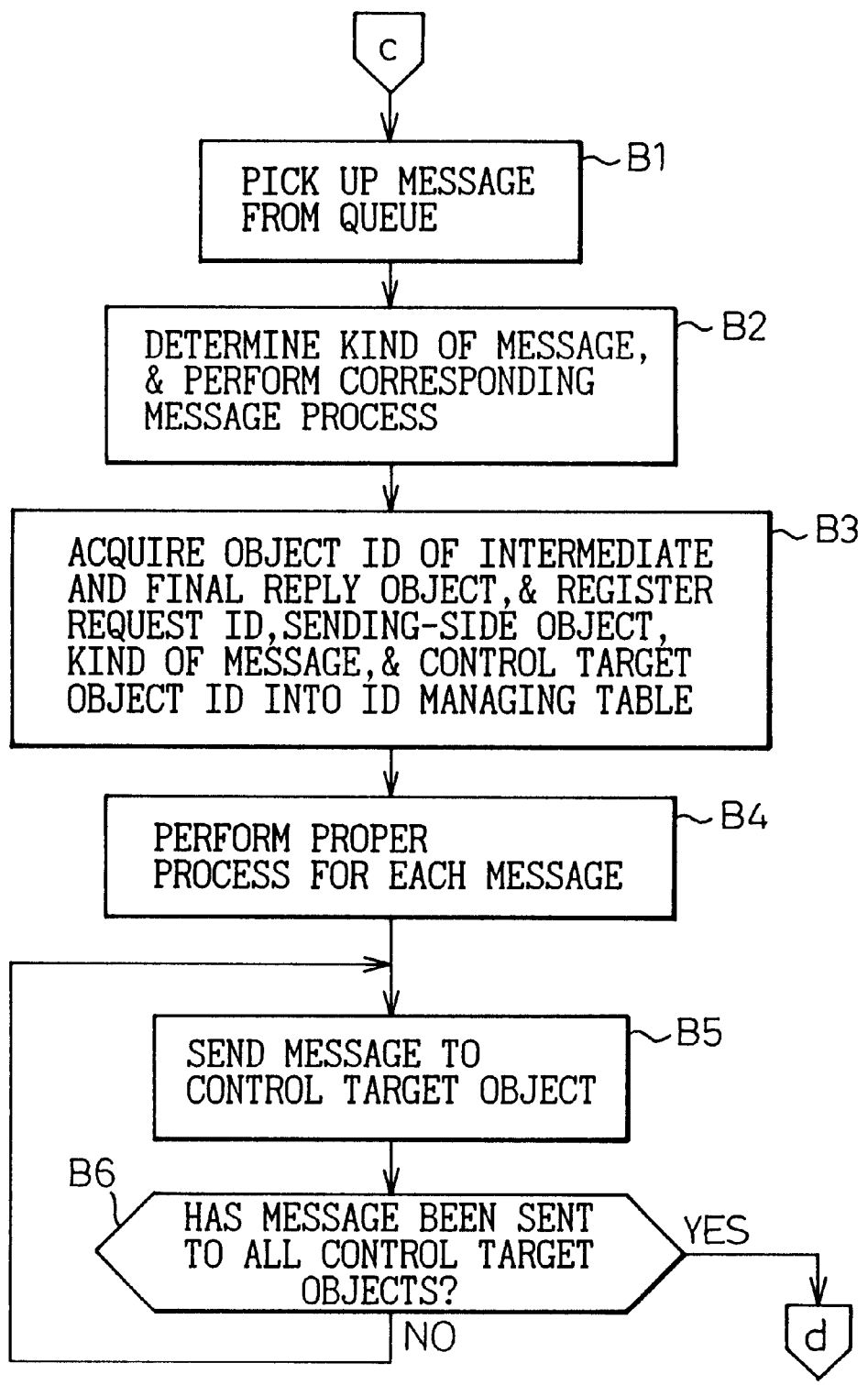
FIG. 8 is a flowchart for explaining message process in a message processing unit in the object A in FIG. 6 according to the third embodiment of the present invention.
Figure 9A:
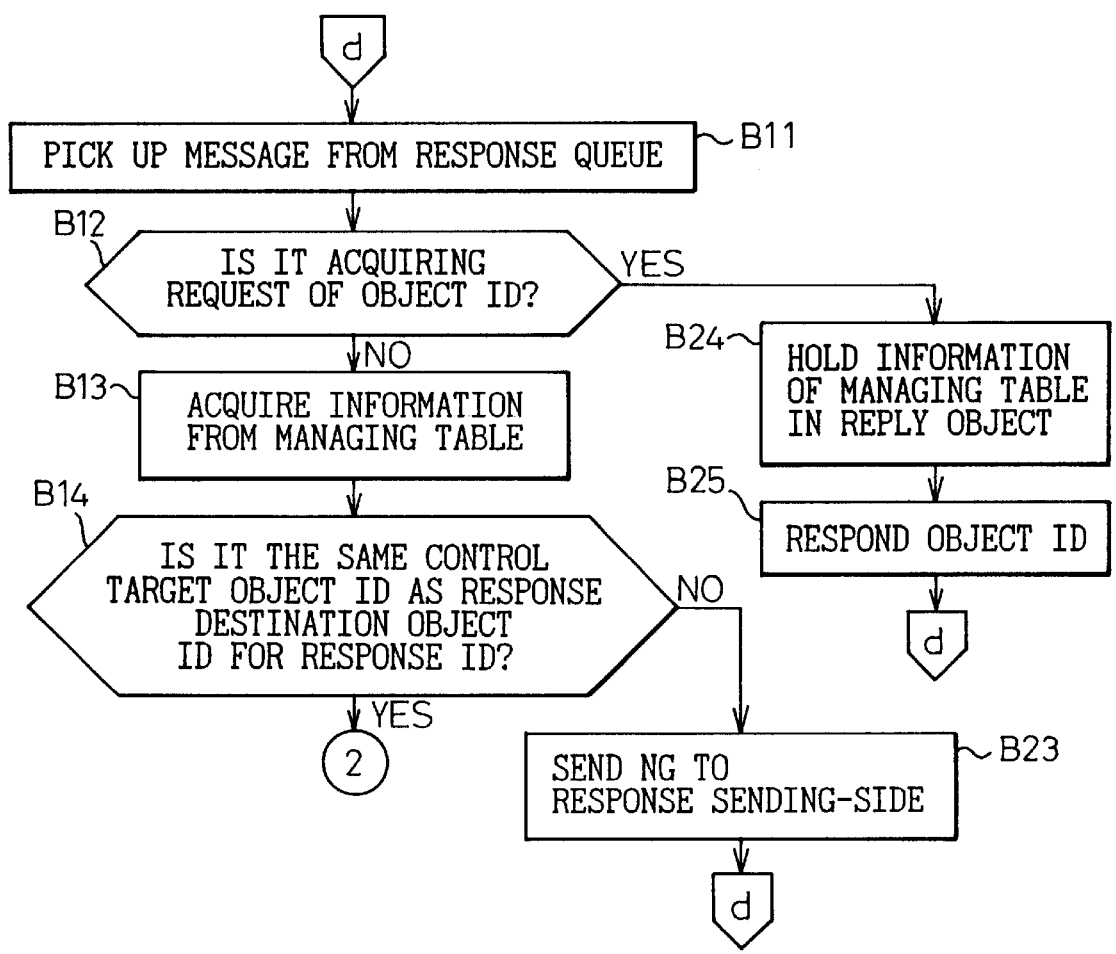

FIG. 8 is a flowchart for explaining a message process in the message processing unit in the object A in FIG. 6 according to a third embodiment of the present invention, and FIGS. 9A and 9B are flowcharts for explaining a message process in the intermediate reply object and the final reply object according to the third embodiment of the present invention.

In FIG. 8, the message processing unit 11A in the object A picks up the message from the queue (B1), detects the kind of the message, and performs the corresponding message process (B2). Further, the message processing unit 11A acquires the object ID of the intermediate and final reply object, and registers the request ID, the kind of destination object message ID and the control target object ID into the managing table (B3).

The message processing unit 11A performs the proper process for each message, for example, reference of database (B4), and sends the message to the control target object (B5). Further, the message processing unit 11A determines whether the message has been sent to all control target objects (B6), and the process is returned to the step B5 when the message is not sent to any control target object.

In FIGS. 9A and 9B, when the message processing unit 11A sends the message to all control target objects (i.e., objects-B and -C), the intermediate reply object 32 and the final reply object 33 pick up the message from the response queue (B11), and determine whether the message is an acquiring request for the object ID from the objects-B and -C (B12). When the message is the acquiring request for the object ID, the information in the managing table is maintained in the reply object (B24), and the object ID is returned to the objects-B and -C (B25).

On the other hand, in step B12, when the message is not the acquiring request for the object ID, the information is acquired from the managing table (B13). The intermediate response managing unit 34 determines whether the control target object ID in the final response managing table coincides with the destination object ID in the response message (B14). When the control target object ID is not the destination object ID, the intermediate response managing unit 34 sends "NG" to the sending-side (B23).

When the control target object ID coincides with the destination object ID, i.e., two objects ID are equal to each other, the response managing unit 34 determines whether the destination to be sent is the intermediate reply object or the final reply object (B15). When the destination is the intermediate reply object 32 (YES), the intermediate reply object 32 detects the kind of the message, performs the corresponding intermediate response process (B16), prepares the intermediate response information (B17), and sends the intermediate response to the destination object (B18). As shown in FIG. 6, the intermediate reply object 32 sends the intermediate response message to the upper control object 1.

When the destination is the final reply object (NO, in step B15), the final reply object 33 detects the kind of the message, performs the corresponding final response process (B19), and prepares the final response information (B20). Further, the final reply object 33 determines whether the final response has been received from all control target objects (B21). When the final reply object receives the final response from all control target objects, the final reply object 33 sends the final response to the destination object (B22). When the final response is not received from any control target object, the process is returned to the step B11.

Figure 10:
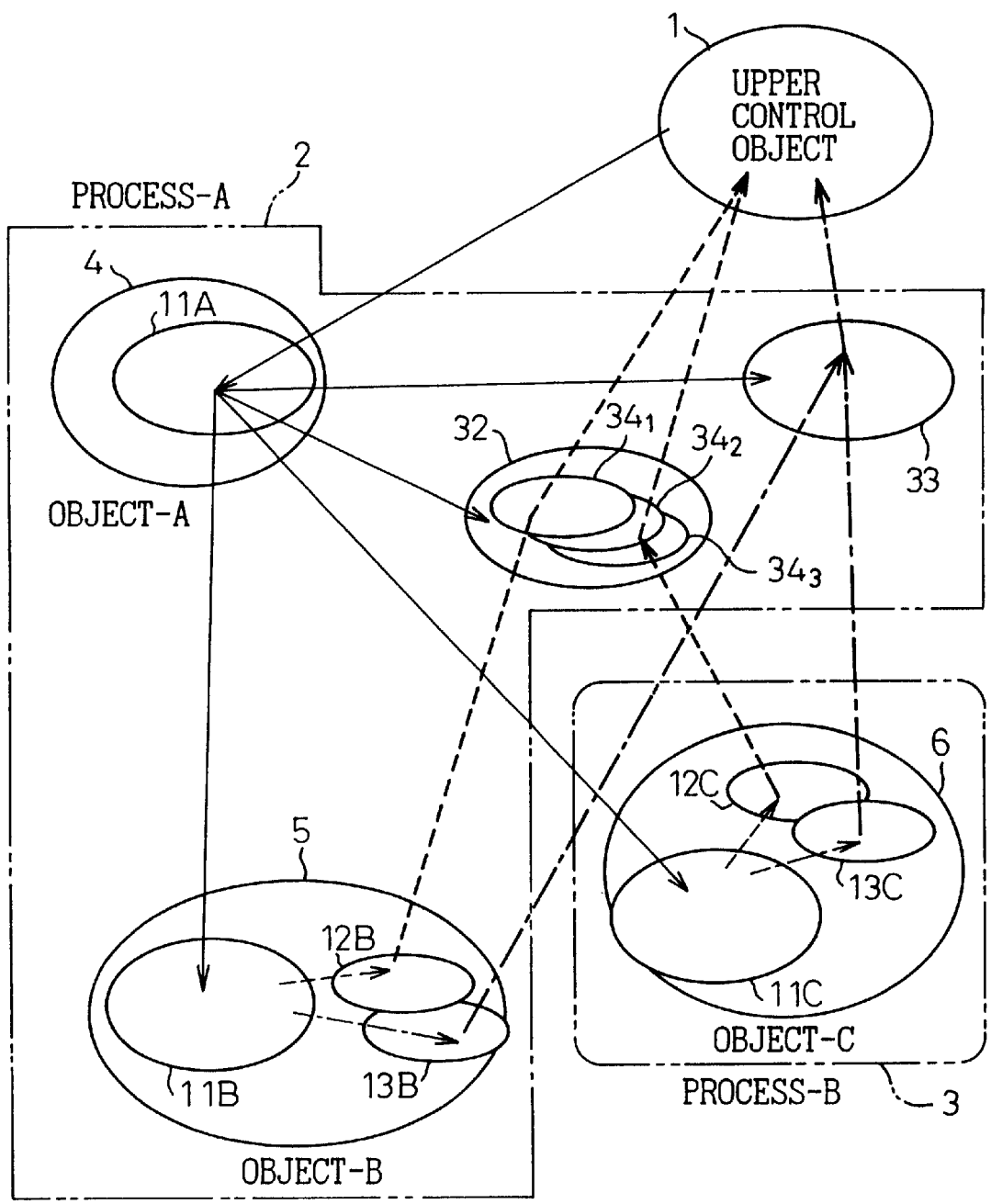
FIG. 10 is an explanatory view of the information managing system according to a fourth embodiment of the present invention.

FIG. 10 is an explanatory view of an information managing system according to a fourth embodiment of the present invention. The same reference numbers used in FIG. 6 are attached to the same components. In FIG. 10, $34_1$, $34_2$ and $34_3$ denote threads of the intermediate response processing unit 34. In this embodiment, in the intermediate reply object 32 for receiving the intermediate response message from the objects-B and -C, a plurality of threads (i.e., the threads $34_1$, $34_2$ and $34_3$ in FIG. 10) are prepared for each intermediate response message in the intermediate response processing unit. Accordingly, since the plurality of threads $34_1$, $34_2$ and $34_3$ can respond to each intermediate response message from the plurality of objects, it is possible to realize the high speed response at the intermediate process.

Figure 11:
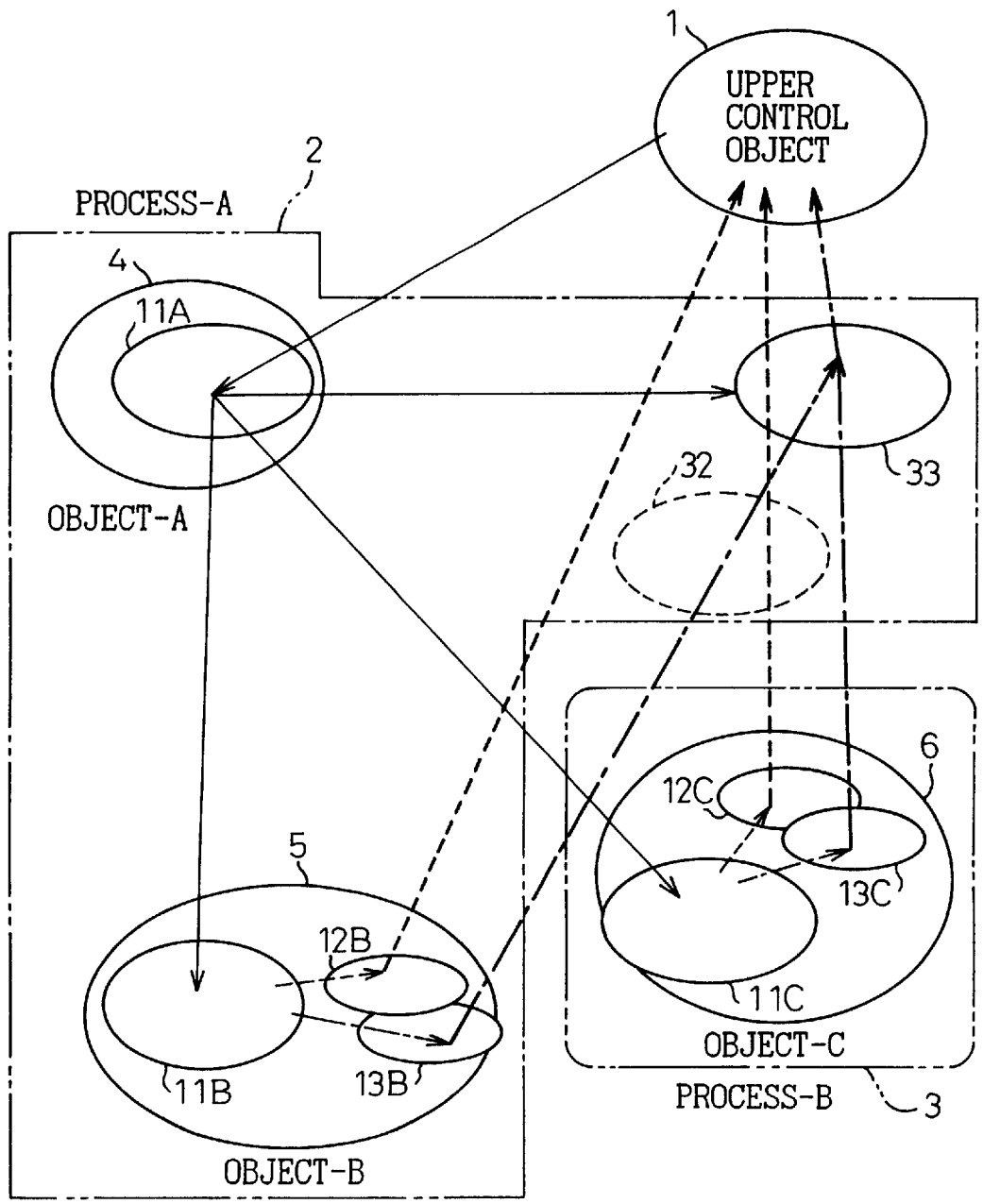
FIG. 11 is an explanatory view of the information managing system according to a fifth embodiment of the present invention.

FIG. 11 is an explanatory view of an information managing system according to a fifth embodiment of the present invention. The same reference numbers used in FIG. 6 are attached to the same components. As is obvious from the drawing, the intermediate reply object 32 in the third and fourth embodiments is omitted in this embodiment. In this case, the intermediate response message from each objects-B and -C is directly sent to the upper control object 1 which is the upper sending-side of the message.

In this embodiment, as well as the embodiments shown in FIGS. 6 and 10, the parameter information in the request message includes the intermediate response destination object name and the final response destination object name as shown in FIG. 7A. The upper control object name is set into areas of the intermediate response destination object name and the final response destination object name.

The message processing unit 11A in the object A acquires the object ID of the final reply object 33 based on the request message from the upper control object 1, sets the upper control object name into the area of the intermediate response destination object name in the parameter information of the request message to be sent to the objects-B and -C, and sets the final reply object name into the area of the final response destination object name.

Accordingly, each intermediate response processing unit 12B and 12C in each object-B and -C sends directly the intermediate response message to the upper control object 1 based on the intermediate response destination object name in the parameter information. Further, each final response processing unit 13B and 13C sends the final response message to the final reply object 33 based on the final response destination object name in the parameter information. In this case, the upper control object 1 receives the intermediate response message from each object-B and -C, receives the final response message through the final reply object 33, and recognizes and processes the response message for each request message.

Figure 12:
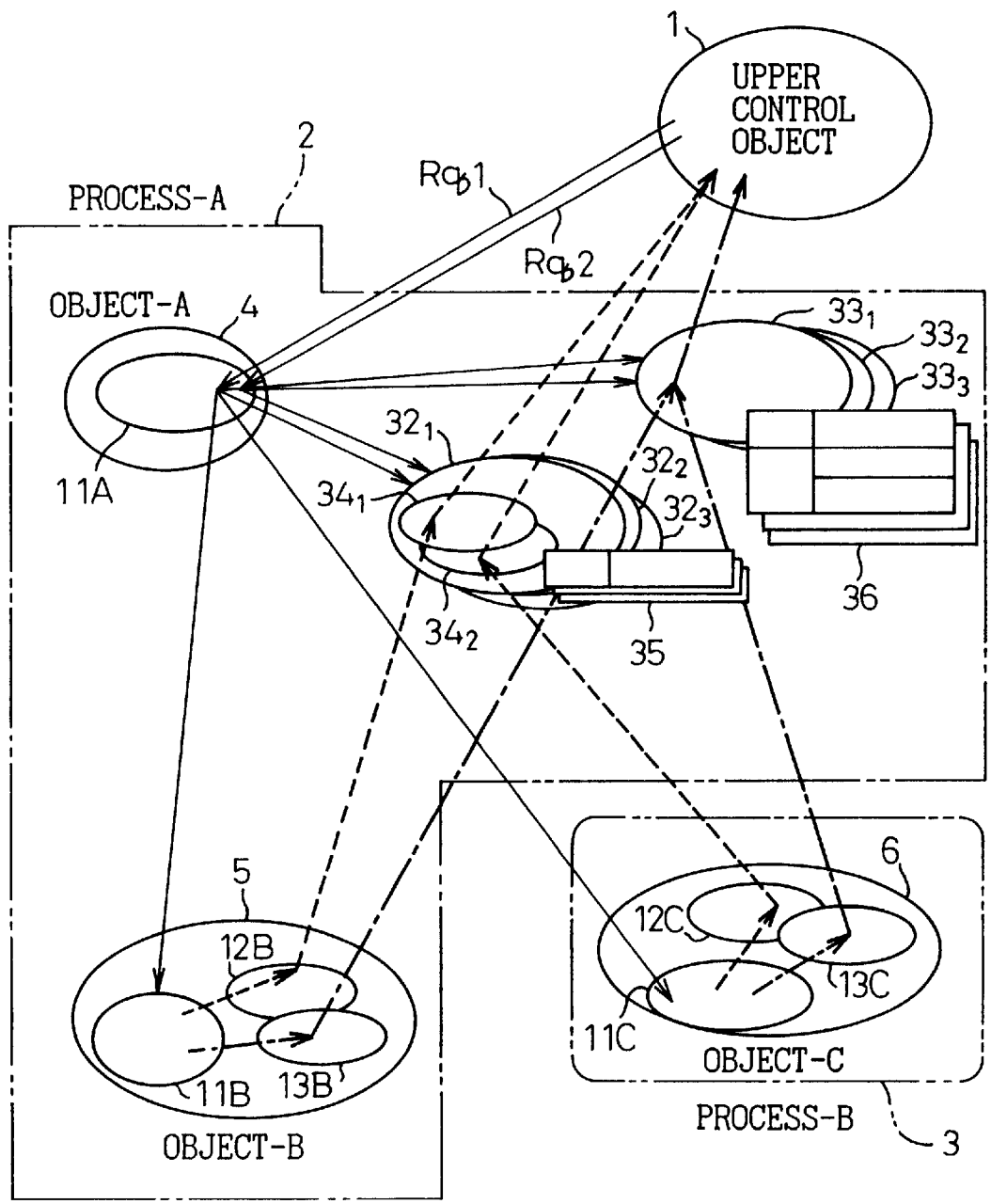
FIG. 12 is an explanatory view of the information managing system according to a sixth embodiment of the present invention.

FIG. 12 is an explanatory view of an information managing system according to a sixth embodiment of the present invention. The same reference numbers used in FIG. 6 are attached to the same components. In the drawing; $32_1$, $32_2$ and $32_3$ denote intermediate reply objects; $33_1$, $33_2$ and $33_3$ denote final reply object; $34_1$ and $34_2$ denote intermediate response processing units; 35 denotes an intermediate response managing table; and 36 denotes a final response managing table.

In this embodiment, corresponding to a plurality of the request messages (only Rq1 and Rq2 are shown) from the upper control object 1, the corresponding intermediate reply objects ($32_1$, $32_2$ and $32_3$) and the corresponding final reply objects ($33_1$, $33_2$ and $33_3$) are prepared. Further, in the plurality of the intermediate reply objects ($32_1$, $32_2$ and $32_3$), the plurality of the intermediate response processing units ($34_1$, $34_2$ and $34_3$) are prepared. Further, the intermediate response managing table 35 and the final response managing table 36 are prepared corresponding to the intermediate reply objects ($32_1$, $32_2$ and $32_3$) and the final reply objects ($33_1$, $33_2$ and $33_3$).

The parameter information in each request message (Rq1 and Rq2) from the upper control object 1 includes the request ID, the instance ID, the control information, the intermediate response destination object name, and the final response destination object name. The upper control object name is set into the areas of the intermediate response destination object name and the final response destination object name.

For example, the message processing unit 11A in the object-A prepares the intermediate reply object $32_1$ and the final reply object $33_1$, for the request message Rq1, and stores the upper control object name, which is extracted from the parameter information, into the intermediate response managing table 35, as the response destination object name as shown in FIG. 7B.

Further, the message processing unit 11A stores the upper control object name, which is extracted from the parameter information, into the final response managing table 36, as the response destination object name as shown in FIG. 7C, and stores the objects-B and -C into the final response managing table 36, as the message destination object name.

When the object-A sends the request message based on the request message Rq1 to the objects-B and -C, the object A sets the title (i.e., an object ID) of the intermediate reply object $32_1$ as the intermediate response destination object name in the parameter information, and sets the title (i.e., an object ID) of the final reply object $33_1$ as the final response destination object name in the parameter information. The objects-B and -C store the intermediate response destination object name and the final response destination object name in the reception managing table (not shown).

Accordingly, each intermediate response processing unit 12B and 12C refers to the reception managing table, and sends the intermediate response message to the intermediate reply object $32_1$. The intermediate reply object $32_1$ prepares the plurality of intermediate response processing units ($34_1$, $34_2$) each corresponding to the received intermediate response message, refers to the intermediate response managing table 35, and sends the intermediate response message to the upper control object 1 since the response destination object name represents the upper control object.

Each final response processing unit 13B and 13C refers to the reception managing table, and sends the final response message to the final reply object 331. The final reply object $33_1$ refers to the final reply managing table 36, and determines whether the message is the final response message from the objects-B and -C each of which is the message destination object.

When the message is the final response message from the objects-B and -C, each final response processing unit 13B and 13C sends the final response message to the upper control object 1 which stores the response destination object name.

In this embodiment, the intermediate reply object and the final reply object are prepared each corresponding to the request message, the intermediate reply object manages the intermediate response destination object based on the intermediate response managing table 35 (see FIG. 7B), and the final reply object manages the destination object of the request message and the final response destination object based on the final response managing table 36 (see FIG. 7C). Accordingly, each intermediate reply object and the final reply object can perform the predetermined processes without recognizing the request ID so that the request can be easily managed.

Figure 13:
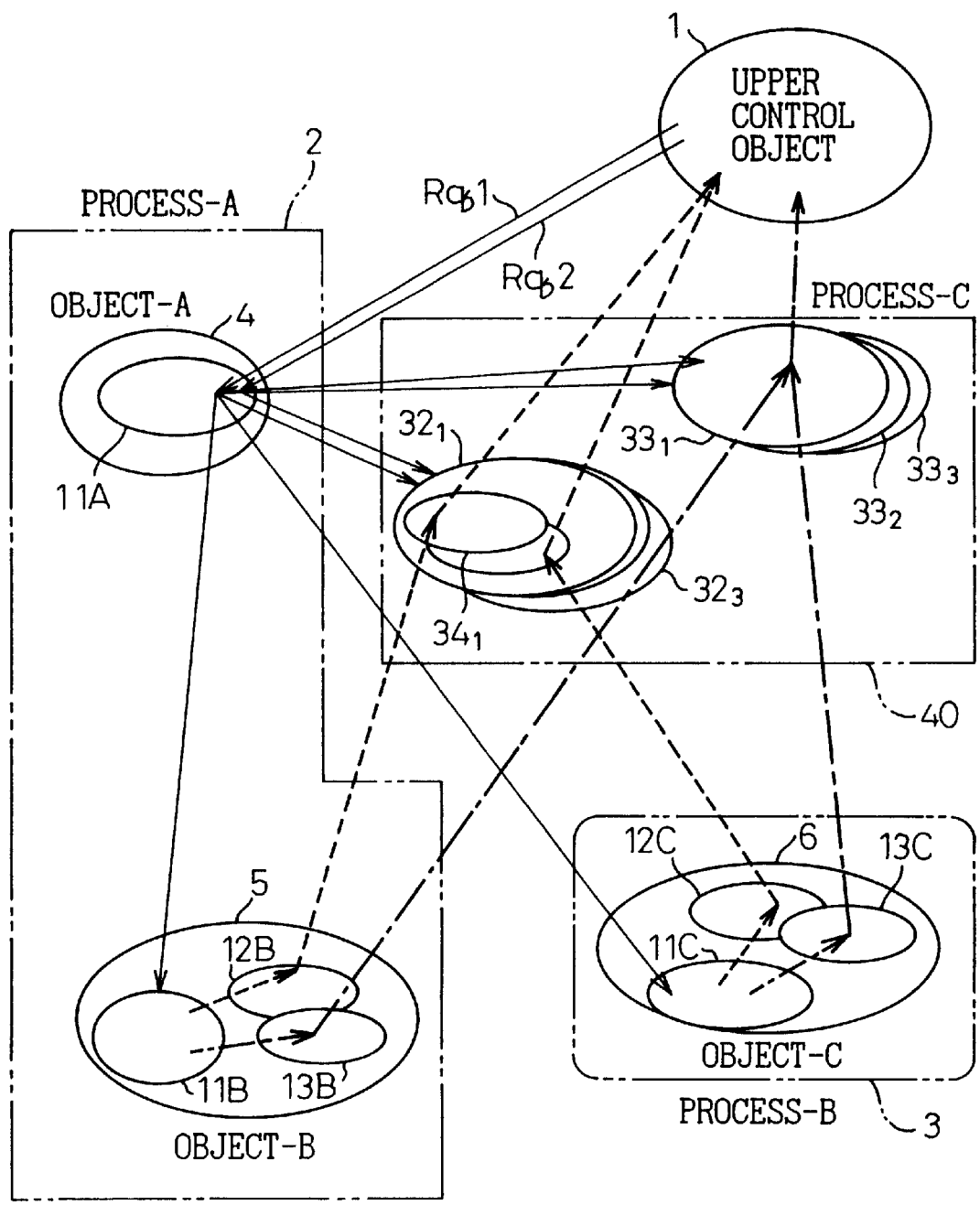
FIG. 13 is an explanatory view of the information managing system according to a seventh embodiment of the present invention.

FIG. 13 is an explanatory view of an information managing system according to a seventh embodiment of the present invention. The same reference numbers used in FIG. 12 are attached to the same components. Reference number 40 denotes a process-C. The process-C includes the intermediate reply objects ($32_1$, $32_2$, $32_3$) and the final reply objects ($33_1$, $33_2$, $33_3$) each of which corresponds to the request messages (Rq1, Rq2).

In this embodiment, the reply object is separated from the object-A, and the separated portion is defined as the process-C. As is obvious from the drawing, sending and receiving the intermediate response and final response messages, each which corresponds to the request messages (Rq1, Rq2) sent from the upper control object 1, are the same processes as that of FIG. 12, the explanations are omitted. Further, since the processes-A, -B and -C are independent from each other, it is possible to distribute loads when processing the intermediate response message and the final response message for the request message.

Figure 14:
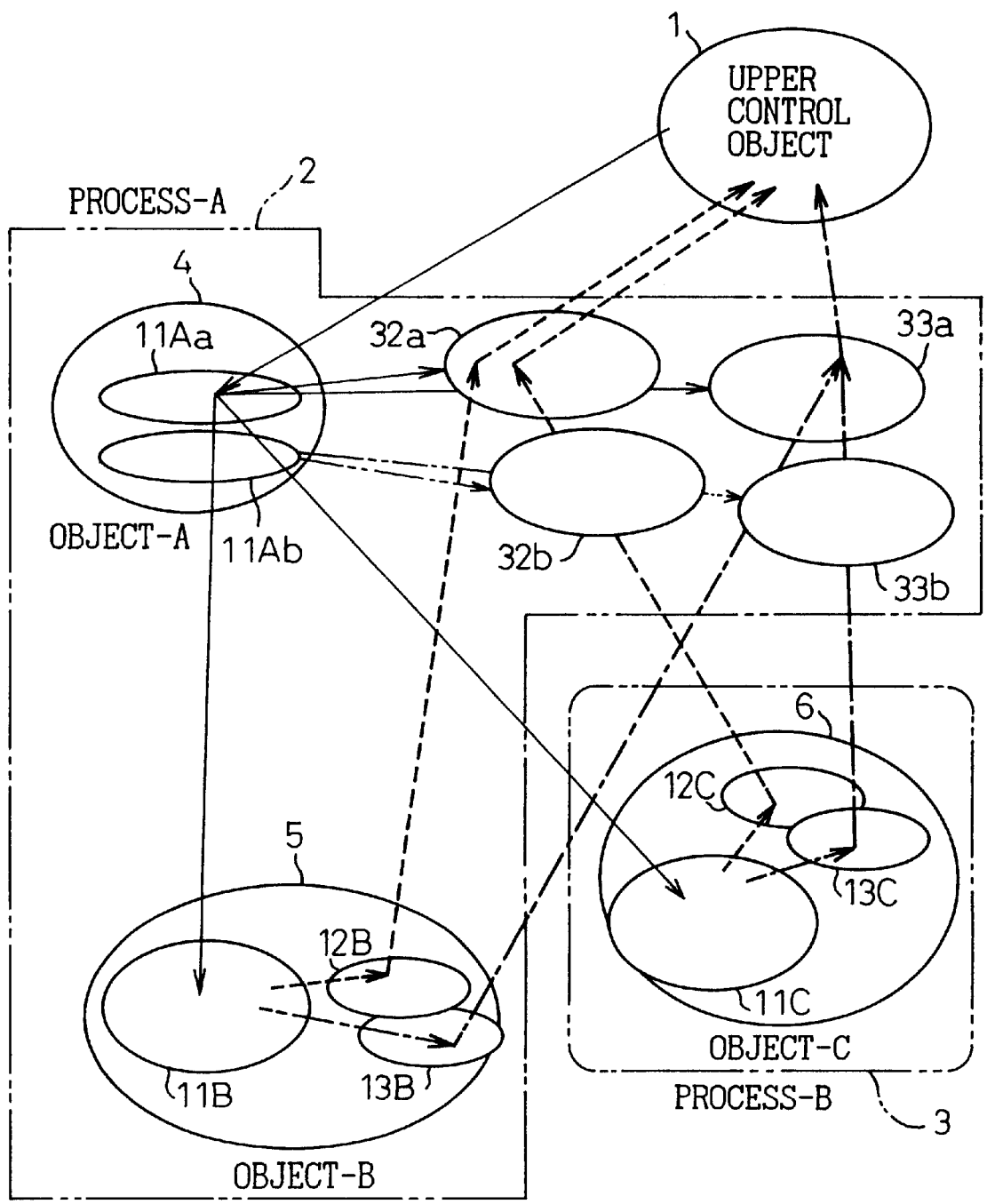
FIG. 14 is an explanatory view of the information managing system according to an eighth embodiment of the present invention.

FIG. 14 is an explanatory view of an information managing system according to an eighth embodiment of the present invention. The same reference numbers used in the previous drawing are attached to the same components. In the drawing, 11A$a$ and 11A$b$ are message processing units each corresponding to the kind of the request message; 32$a$ and 32$b$ are intermediate reply objects each corresponding to the kind of the request message; 33$a$ and 33$b$ are final reply objects each corresponding to the kind of the message. That is, "a", "b" and "c" represent the kind of the request message, and the message processing unit, the intermediate reply object and the final reply object are provided corresponding to each kind of the request message.

As the kind of the request message, there are an acquisition (GET), a setting (SET), a creation of object (CREATE), an operation of object (ACTION), and a deletion of object (DELETE). For example, the message processing unit 11A$a$ in the object A corresponds to the kind of the request message "a" from the upper control object 1. The message processing unit 11A$a$ acquires the object ID in the intermediate reply object 32$a$ and the final reply object 33$a$ which correspond to the kind of the request message "a", sets the title of the intermediate reply object 32$a$ into the area of the intermediate response destination object name in the parameter information of the request message which is sent to the objects-B and -C, and sets the title of the final reply object 33$a$ into the area of the final response destination object name.

Accordingly, each message processing unit 11B and 11C in performs a reception process for the request message, and stores the intermediate response destination object name and the final response destination object name in the reception managing table (not shown). Each intermediate response processing unit 12B and 12C sends the intermediate response message to the intermediate reply object 32$a$. Similarly, each final response processing unit 13B and 13C sends the final response message to the final reply object 33$a$. As mentioned above, since the upper control object name is set into the intermediate reply object 32$a$ and the final reply object 33$a$ as the response destination object name, each intermediate reply object 32$a$ and the final reply object 33$a$ sends them to the upper control object 1.

Further, when the kind of the request message from the upper control object 1 is "b", the message processing unit 11A$b$ in the object A performs the reception process for the request message from the upper control object 1. The message processing unit 11A$b$ acquires the object ID of the intermediate reply object 32$b$ and the final reply object 33$b$, each of which corresponds to the kind of the message "b", as shown by chain-dotted lines. Further, the message processing unit 11A$b$ sets the title of the intermediate reply object name as the intermediate response destination object name and the title of the final reply object 33$b$ as the final response destination object name.

Accordingly, for the request message of the kind "b", the intermediate response message and the final response message are sent from the objects-B and -C to the intermediate reply object 32$b$ and the final reply object 33$b$. As mentioned above, since the intermediate reply object and the final reply object are designated for each kind of the message, it is not necessary to determine the kind of the message in the reply object so that it is possible to realize high-speed response between objects.

Figure 15:
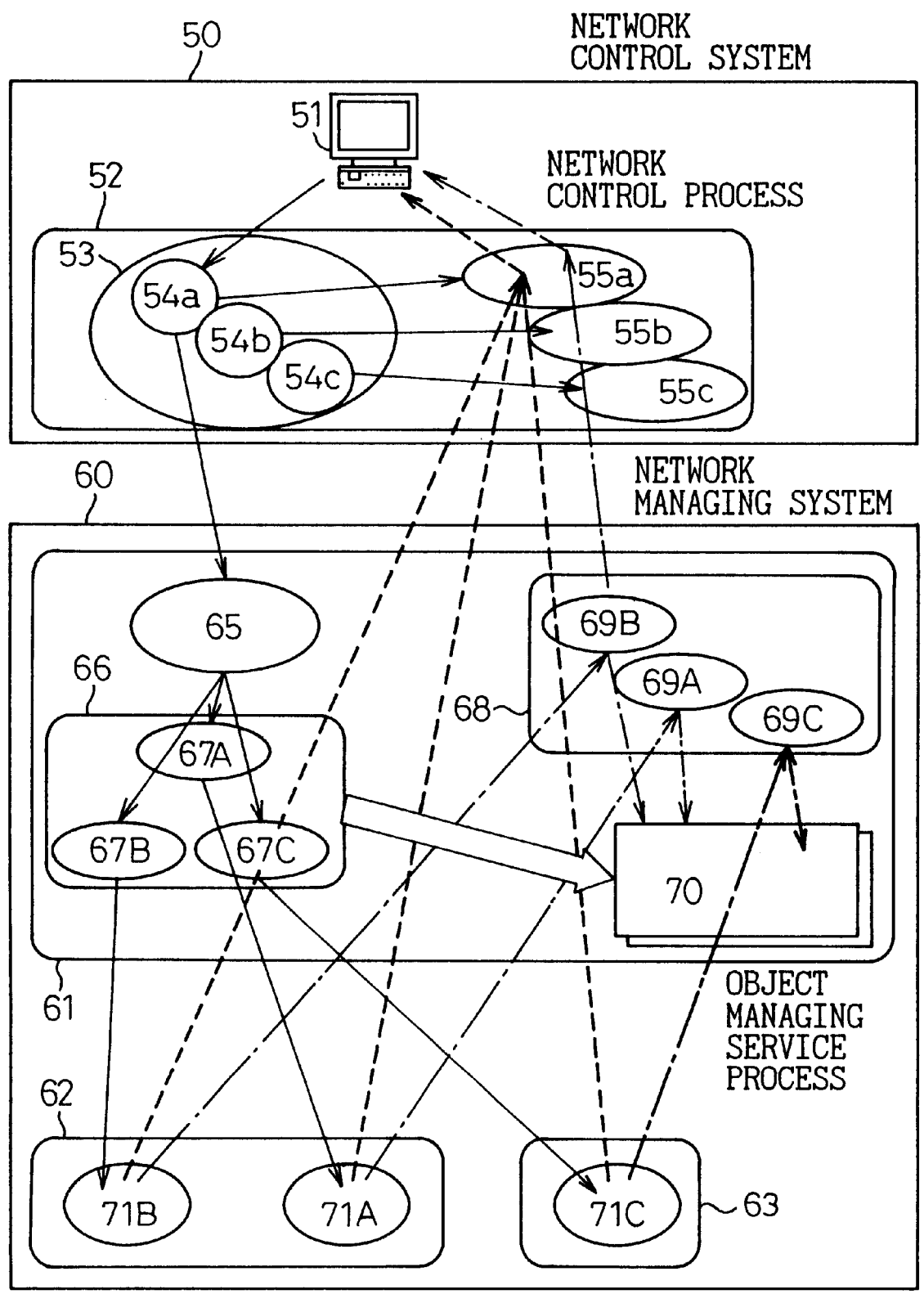
FIG. 15 is an explanatory view of the information managing system according to a ninth embodiment of the present invention.

FIG. 15 is an explanatory view of an information managing system according to a ninth embodiment of the present invention. In the drawing, 50 is a network control system, 51 is a work station as a control terminal, 52 is a network control process, and 53 is a network control object. Further, 54a is a GET operation function unit, 54b is a SET operation function unit, and 54c is an ACTION operation function unit. Still further, 55a is a GET reply object, 55b is a SET reply object, and 55c is an ACTION reply object.

Further, 60 is a network managing system, 61 is an object managing service process, 62 and 63 are function processes, 65 is an object managing object, 66 is a containment-tree object, 67A to 67C are node objects, 68 is a final reply object group, 69A to 69C are final reply objects, 70 is a final response managing table, and 71A to 71C are function objects. Further, each solid line having an arrow shows flow of the request message, each dotted-line having the arrow shows flow of the intermediate response message, and each chain-dotted line shows flow of the final response message.

In this embodiment, the work station 51 in the network control system 50 determines the function object 71A as the control target object, and requests the GET operation, in which all information managed by the function object 71A are set to search conditions, to the function object 71A. Based on the request from the work station 51, the network control process 52 sends the request message from the GET operation function unit 54a in the network control object 53 to the network managing system 60.

In this case, the network managing system 60 acquires the object ID of the GET reply object 55a which corresponds to the GET operation function unit 54a. Further, the control information for the request message is set to the information of the control target object managed by the object managing object 65 and to the information of search conditions covered by the function object 71A. Further, in accordance with the parameter information shown in FIG. 7A, the GET reply object 55a is designated as the intermediate response object, and the GET reply object 55a is designated as the final response destination object.

The object managing object 65 in the object managing service process 61 manages relationship of the containment tree among node objects 67A to 67C, and each node object 67A to 67C manages the relationship of the containment tree among the corresponding function object 71A to 71C. In these function objects 71A to 71C, the following explanations are given in the case that the function objects 71B and 71C are covered by the function object 71A.

The object managing object 65 receives the request message sent from the GET operation function unit 54a, and sends the request message to the function objects 71A to 71C through the node objects 67A to 67C in the containment tree object 66 since the search conditions are set to all information managed by the function object 71A. As shown by the large arrow line, the request message is registered from the containment tree object 66 to the final response managing table 70 in accordance with the request ID.

The final response managing table 70 includes the request ID, the final response destination object name, the message destination object name, and a final response counter. For example, in the final response managing table 70, it is possible to set the request ID=1 of the request message received by the object managing object 65, the title of the GET reply object as the final response destination object name, the titles of the function objects 71A to 71C as the message destination object name, and the final response counter=3 (the number of the message destination object is preset and count down is performed based on the reception of the final response message).

Further, as the parameter information of the request message from the node objects 67A to 67C to the function objects 71A to 71C, the following titles, i.e., the title of the GET reply object 55a as the intermediate response destination object name, and the title of the final reply objects 69A to 69C as the final response destination object name corresponding to the node objects 67A to 67C, are set in the parameter information.

Accordingly, the function object 71A in the function process 62 sends the intermediate response message to the GET reply object 55a, and sends the final response message to the final reply object 69A. Further, the function object 71B in the function process 62 sends the intermediate response message to the GET reply object 55a, and sends the final response message to the final reply object 69B. Further, the function object 71C in the function process 63 sends the intermediate response message to the GET reply object 55a, and sends the final response message to the final reply object 69C.

The GET reply object 55a receives the intermediate response message from the function objects 71A to 71C, and transfers them to the work station 51. The final reply objects 69A to 69C receive the final response message from the function objects 71A to 71C, and perform count down of the final response counter in the final response managing table 70. When the counter becomes "0", since all final response messages have been received from all destination objects for the request message, the final response message is sent to the GET reply object 55a of the message sending-side. The GET reply object 55a sends the final response message to the work station 51 in the message sending-side.

The present invention is not limited to only the scope of the above-mentioned embodiments, and it is possible to provide additional modifications by combining each embodiment. For example, when the request messages are sequentially sent to a plurality of objects each corresponding to a hierarchy structure of the object, the response message is processed by the reply object so that it is possible to improve the response characteristic. Further, the reply object can be mounted for each process, each object and each operation so that the present invention can be applied to various information processing system.

As explained above, according to the present invention, the reply object 21 is provided for receiving the response message from the destination object of the request message, and for sending the response message to the sending-side object of the request message. As a result, in the response characteristic between the upper control object and the object-A for sending the request message to the control targets (objects-B and -C), since the response messages from the control target objects-B and -C are processed in the reply object 21, it is possible to improve the response characteristic at the message process in various information processing system.

When there are intermediate response message and the final response message as the response message, the intermediate reply object and the final reply object are provided corresponding to the intermediate response message and the final response message so that it is possible to realize high-speed process in complicated processes.

Still further, as the parameter information in the message, since the response destination object name, the intermediate response destination object name and the final response destination name are added into the parameter information, it is possible to send and process the response message from the control target object to the reply object, the intermediate reply object or the final reply object, and it is possible to improve the response characteristic of the object when sending the request message to the control target object.

What is claimed is:

1. An object-oriented type information managing system comprising:

a network control system and a network managing system;

the network control system including an upper control object; and the network managing system including a plurality of processes each having one or more objects, one object being used as a relay object for receiving a request message from the upper control object, and other objects being used as request message destination objects managed by the relay object and each returning a response message, wherein at least one process in the plurality of processes comprises a reply object for receiving the response messages as intermediate response messages and final response messages both sent from the destination objects and directly sending them to the upper control object.

2. An object-oriented type information managing system as claimed in claim 1, wherein the reply object comprises an intermediate response processing unit for receiving said intermediate response messages sent from the destination objects and sending them to the upper control object, and a final response processing unit for receiving said final response messages sent from the destination objects and sending them to the upper control object.

3. An object-oriented type information managing system as claimed in claim 2, wherein the reply object further comprises:

a request ID managing table for managing a response sending-side object based on a request ID for distinguishing the request message; and a final response managing table for managing the destination objects in accordance with the request ID; and wherein these tables are provided within the reply object.

4. An object-oriented type information managing system as claimed in claim 1, wherein the reply object further comprises:

a request ID managing table for managing a response sending-side object based on a request ID for distinguishing the request message; and a final response managing table for managing the destination objects in accordance with the request ID, wherein these tables are provided within the reply object.

5. An object-oriented type information managing system as claimed in claim 1, wherein the reply object further comprises an intermediate reply object for receiving said intermediate response messages sent from the destination objects, and a final reply object for receiving said final response messages sent from the destination objects.

6. An object-oriented type information managing system as claimed in claim 5, wherein the intermediate reply object comprises a multi-thread structure consisting of a plurality of threads each of which is provided corresponding to the intermediate response messages.

7. An object-oriented type information managing system as claimed in claim 1, wherein a plurality of reply objects are provided corresponding to a plurality of request messages when the request messages are sent to the destination objects.

8. An object-oriented type information managing system as claimed in claim 1, wherein a plurality of reply objects are provided corresponding to a plurality of kinds of request messages when the request messages are sent to the destination objects.

9. A method for controlling messages between objects in an object-oriented type information managing system comprising:

a network control system and a network managing system;

the network control system including an upper control object; and the network managing system including a plurality of processes each having one or more objects, one object being used as a relay object for receiving a request message from the upper control object, and other objects being used as request message destination objects managed by the relay object and each returning a response message, wherein the method comprises:

providing a reply object in at least one process in the plurality of processes for receiving the response messages as intermediate response messages and final response messages both sent from the destination objects and sending them to the upper control object;

providing an area for setting a response destination object name in an parameter information contained in the request message; setting a replay object name as the response destination object name of the parameter information; and performing reception process of the intermediate response messages and the final response messages, which are sent from the destination objects, in the reply object.

10. A method for controlling messages between objects in an object-oriented type information managing system as claimed in claim 8, wherein the method further comprises:

constituting the reply object by an intermediate reply object and a final reply object;

providing an area for setting an intermediate response destination object name into the parameter information for designating the intermediate reply object;

providing another area for setting a final response destination object name into the parameter information for designating the final reply object;

performing reception process of intermediate response messages, which are sent from the destination objects, in the intermediate reply object; and performing reception process of said final response messages, which are sent from the destination objects, in the final reply object.

11. A method for controlling messages between objects in an object-oriented type information managing system as claimed in claim 10, wherein the method further comprises:

preparing an intermediate response processing unit having a multi-thread structure each corresponding to respective one of the intermediate response messages in the intermediate reply object; and performing reception process of said intermediate response messages from the destination objects.

12. A method for controlling messages between objects in an object-oriented type information managing system as claimed in claim 10, wherein the method further comprises:

preparing a plurality of intermediate reply objects and final reply objects each of which is provided corresponding to kinds of the request messages; and sending said intermediate response messages and said final response messages from the destination objects to the intermediate reply object and the final reply object.

13. A method for controlling messages between objects in an object-oriented type information managing system as claimed in claim 9, wherein the method further comprises:

preparing an intermediate response processing unit having a multi-thread structure each corresponding to respective one of the intermediate response message in the intermediate reply object; and performing reception process of said intermediate response messages from the destination objects.

14. A method for controlling messages between objects in an object-oriented type information managing system as claimed in claim 9, wherein the method further comprises:

preparing a plurality of intermediate reply objects and final reply objects each of which is provided corresponding to kinds of the request messages; and sending said intermediate response messages and said final response messages from the destination objects to the intermediate reply object and the final reply object.

15. A method for controlling messages between objects in an object-oriented type information managing system, comprising:

a network control system and a network managing system;

the network control system including an upper control object; and the network control system including a plurality of processes each having one or more objects, one object being used as a relay object for receiving a request message from the upper control object, and other objects being used as request message destination objects manages by the relay object and each returning a response message, wherein the method comprises:

providing a reply object in at least one process in the plurality of processes for receiving the response message sent from the destination objects and sending them to the upper control object;

providing an area for setting a response destination object name in a parameter information contained in the request message;

setting a reply object name as the response destination object name of the parameter information; and performing reception process of response messages, which are sent from the destination objects, in the reply object, wherein the method further comprises setting a request message sending-side object name as the intermediate response destination object name in the parameter information;

setting the final reply object name as the final response destination object name in the parameter information; and sending the intermediate response messages from the destination objects to the request message sending-side object, and the final response messages from the destination objects to the request message sending-side object.

* * * * *